(12) United States Patent
You et al.

(10) Patent No.: US 12,340,181 B1
(45) Date of Patent: Jun. 24, 2025

(54) CONVERSATION DIALOGUE ORCHESTRATION IN VIRTUAL ASSISTANT COMMUNICATION SESSIONS

(71) Applicant: FMR LLC, Boston, MA (US)

(72) Inventors: Jia You, Cary, NC (US); Tieyi Guo, Frisco, TX (US); Byung Chun, Kingston, MA (US); Brian Christoper Mansfield, Milford, OH (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 18/933,483

(22) Filed: Oct. 31, 2024

(51) Int. Cl.
  *G06F 40/35* (2020.01)
  *H04L 51/02* (2022.01)

(52) U.S. Cl.
  CPC .............. *G06F 40/35* (2020.01); *H04L 51/02* (2013.01)

(58) Field of Classification Search
  None
  See application file for complete search history.

(56) References Cited

U.S. PATENT DOCUMENTS

| | | | |
|---|---|---|---|
| 6,446,120 | B1 | 9/2002 | Dantressangle |
| 7,228,278 | B2 | 6/2007 | Nguyen et al. |
| 7,412,260 | B2 | 8/2008 | Gailey et al. |
| 8,630,961 | B2 | 1/2014 | Beilby et al. |
| 9,172,747 | B2 | 10/2015 | Walters et al. |
| 9,318,108 | B2 | 4/2016 | Gruber et al. |
| 9,767,794 | B2 | 9/2017 | Vibbert et al. |
| 10,109,297 | B2 | 10/2018 | Brown et al. |
| 10,127,224 | B2 | 11/2018 | DeLeeuw |
| 10,313,404 | B2 | 6/2019 | Ein-Gil et al. |

(Continued)

FOREIGN PATENT DOCUMENTS

CN 113987107 A 1/2022

OTHER PUBLICATIONS

"Gathering information with slots," IBM Cloud Docs /Watson Assistant (Managed), retrieved from https://cloud.ibm.com/docs/assistant?topics=assistant-dialog-slots on Feb. 16, 2021, 12 pages.

(Continued)

*Primary Examiner* — Richa Sonifrank
(74) *Attorney, Agent, or Firm* — Cesari and McKenna, LLP

(57) ABSTRACT

Methods and apparatuses for conversation dialogue orchestration in virtual assistant communication sessions include a server that establishes a chat session between a virtual assistant (VA) application and a client device. The VA application captures an utterance generated by a user and processes the utterance to instantiate a dialogue behavior tree comprising workflow agents each associated with executable code for completing a corresponding workflow action. The VA application traverses the behavior tree to generate a response to the utterance, including evaluating one or more conditions associated with a workflow agent to determine whether to execute the code in the workflow agent, and when the conditions associated with the workflow agent are met, executing the code to complete the workflow action and storing a sub-response in a dialogue memory. The VA application coalesces the sub-responses to generate a final response and transmits the final response to the client device.

18 Claims, 20 Drawing Sheets

(56) References Cited

U.S. PATENT DOCUMENTS

| | | | |
|---|---|---|---|
| 10,452,695 B2 | 10/2019 | Rodgers | |
| 10,453,454 B2 | 10/2019 | Homma et al. | |
| 10,650,817 B2 | 5/2020 | Choi et al. | |
| 10,795,640 B1 | 10/2020 | Knight et al. | |
| 10,839,167 B2 | 11/2020 | Mahajan et al. | |
| 10,902,533 B2 | 1/2021 | McConnell et al. | |
| 10,984,784 B2 | 4/2021 | Kuczmarski et al. | |
| 11,134,152 B2 | 9/2021 | McGann et al. | |
| 11,196,863 B2 | 12/2021 | Spohrer | |
| 11,379,446 B1 | 7/2022 | Detmer et al. | |
| 11,463,387 B1 | 10/2022 | Panati et al. | |
| 11,468,282 B2 | 10/2022 | Sanghavi et al. | |
| 11,609,941 B2 | 3/2023 | Folland et al. | |
| 11,646,022 B2 | 5/2023 | Kang et al. | |
| 11,727,923 B2 * | 8/2023 | Maheswaran | G10L 15/1822 704/9 |
| 11,734,089 B2 | 8/2023 | Detmer | |
| 11,741,529 B2 | 8/2023 | Siefken et al. | |
| 11,763,097 B1 | 9/2023 | Thomas et al. | |
| 11,777,875 B2 | 10/2023 | Uppala et al. | |
| 11,966,705 B2 | 4/2024 | Detmer et al. | |
| 12,184,812 B2 * | 12/2024 | Koneru | G06F 40/30 |
| 12,229,510 B2 * | 2/2025 | Lukyanenko | G06F 40/279 |
| 12,235,897 B1 * | 2/2025 | Hao | G06F 16/7844 |
| 2002/0032591 A1 | 3/2002 | Mahaffy et al. | |
| 2003/0132958 A1 | 7/2003 | Himmel et al. | |
| 2004/0218751 A1 | 11/2004 | Colson et al. | |
| 2012/0041903 A1 | 2/2012 | Beilby et al. | |
| 2014/0279050 A1 | 9/2014 | Makar et al. | |
| 2016/0042735 A1 | 2/2016 | Vibbert et al. | |
| 2016/0094492 A1 | 3/2016 | Li et al. | |
| 2017/0148073 A1 | 5/2017 | Nomula et al. | |
| 2017/0324867 A1 | 11/2017 | Tamblyn et al. | |
| 2018/0131643 A1 | 5/2018 | Trufinescu et al. | |
| 2018/0287968 A1 * | 10/2018 | Koukoumidis | G06F 40/289 |
| 2018/0293983 A1 | 10/2018 | Choi et al. | |
| 2018/0337872 A1 | 11/2018 | Fawcett | |
| 2019/0089655 A1 | 3/2019 | Uppala et al. | |
| 2019/0095524 A1 | 3/2019 | Rodgers | |
| 2019/0180258 A1 | 6/2019 | Amar et al. | |
| 2019/0188590 A1 | 6/2019 | Wu et al. | |
| 2019/0258456 A1 | 8/2019 | Byun et al. | |
| 2019/0311036 A1 | 10/2019 | Shanmugam et al. | |
| 2019/0311713 A1 | 10/2019 | Talwar et al. | |
| 2020/0005118 A1 | 1/2020 | Chen et al. | |
| 2020/0007380 A1 | 1/2020 | Chen et al. | |
| 2020/0081939 A1 | 3/2020 | Subramaniam | |
| 2020/0126540 A1 | 4/2020 | Panchamgam et al. | |
| 2020/0175118 A1 | 6/2020 | Mahajan et al. | |
| 2020/0273089 A1 | 8/2020 | Siefken et al. | |
| 2020/0320984 A1 | 10/2020 | Kuczmarski et al. | |
| 2020/0364300 A1 | 11/2020 | Tan et al. | |
| 2020/0380077 A1 * | 12/2020 | Ge | G10L 15/18 |
| 2020/0380991 A1 * | 12/2020 | Ge | G10L 15/18 |
| 2021/0004390 A1 | 1/2021 | Li et al. | |
| 2021/0019707 A1 * | 1/2021 | Sathiamoorthy | H04L 51/046 |
| 2021/0035576 A1 | 2/2021 | Kang et al. | |
| 2021/0142009 A1 | 5/2021 | Detmer et al. | |
| 2021/0160373 A1 * | 5/2021 | Mcgann | G06F 40/30 |
| 2021/0312904 A1 | 10/2021 | Shukla et al. | |
| 2022/0070282 A1 * | 3/2022 | Sobhani | H04L 41/145 |
| 2023/0186161 A1 * | 6/2023 | Arthur | G06F 40/58 704/2 |
| 2023/0376352 A1 * | 11/2023 | Zuzga | G06F 9/5027 |
| 2024/0195776 A1 | 6/2024 | Detmer et al. | |
| 2024/0257142 A1 * | 8/2024 | Thomas | H04L 51/04 |
| 2025/0029608 A1 * | 1/2025 | Mohan | G10L 15/22 |

OTHER PUBLICATIONS

L. Messinger, "How to Build an End-to-End Conversational AI System using Behavior Trees," freeCodeCamp, dated Apr. 12, 2019, available at https://www.freecodecamp.org/news/how-to-build-an-end-to-end-conversational-ai-system-using-behavior-trees-658a7122e794/, 23 pages.

S. Shu et al., "A Behavior Tree Cognitive Assistant System for Emergency Medical Services," 2019 IEEE/RSJ International Conference on Intelligent Robots and Systems (IROS), Macau, China, 2019, pp. 6188-6195, doi: 10.1109/IROS40897.2019.8968233.

* cited by examiner

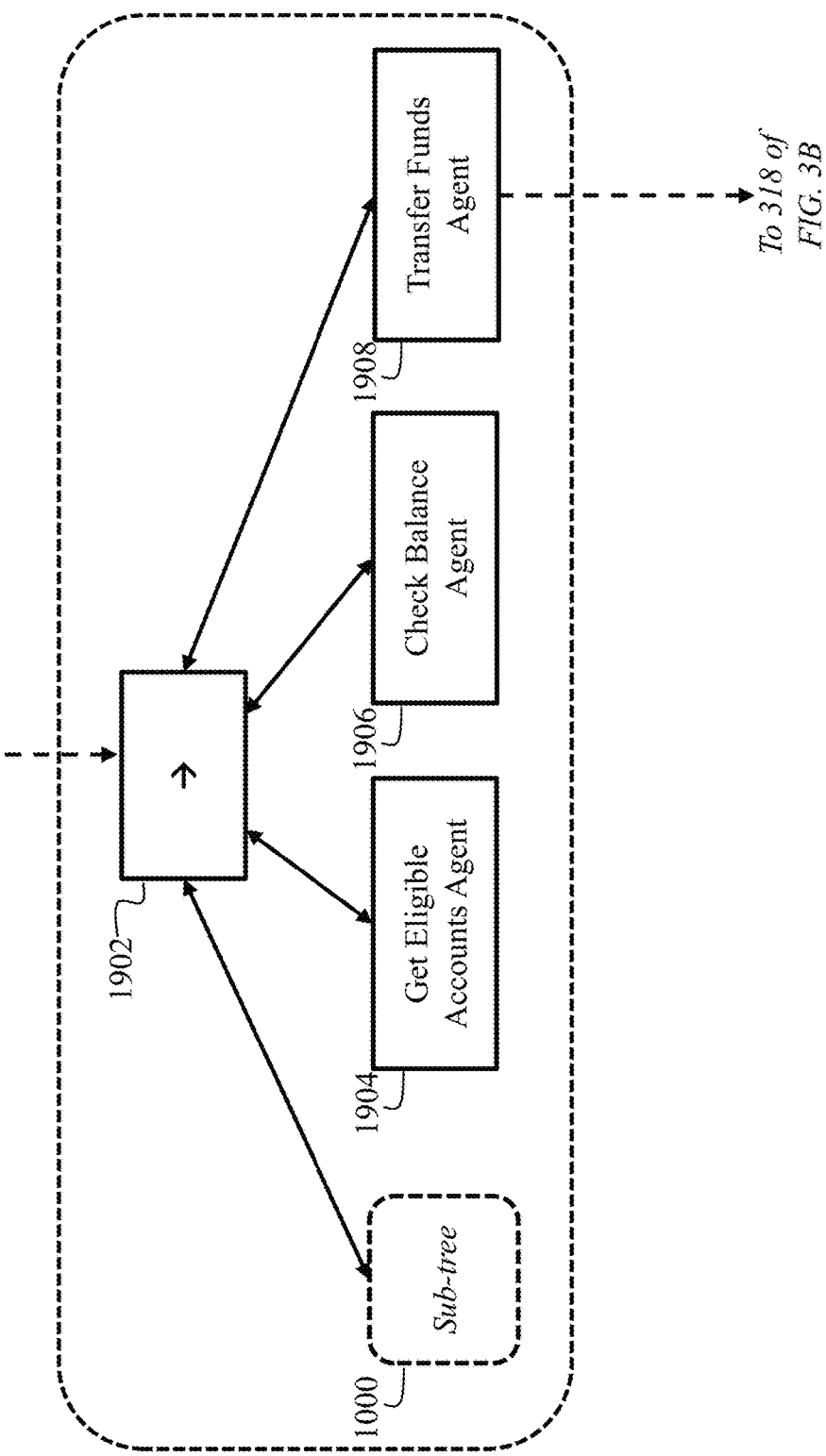

CONVERSATION DIALOGUE ORCHESTRATION IN VIRTUAL ASSISTANT COMMUNICATION SESSIONS

TECHNICAL FIELD

This application relates generally to methods and apparatuses, including computer program products, for conversation dialogue orchestration in virtual assistant communication sessions.

BACKGROUND

As computing technology has become commonplace, many users have abandoned the use of live telephone conversations with service agents and representatives to answer questions and resolve issues, in favor of electronic communications such as text-based online chat sessions over the Internet involving the use of computing devices and related chat-based software. To efficiently manage this form of communication, many organizations are turning to automated conversation service software applications (such as virtual assistants (VAs) and chatbots) to interact with end users intelligently using advanced language processing and data interpretation technology. Typically, such automated systems follow a linear script that analyzes individual messages coming from an end user in order to determine the user's intent and maps the intent to pre-defined outcomes or actions so that the VA software can respond in a way that meets the end user's needs or goals. However, such intent-based, scripted VA software usually lacks complex decision-making capability and adaptability in appropriately generating responses to user messages during a chat session. In addition, such VA software may be difficult to change or scale as user needs evolve, due to the inflexibility of the scripted intent structure. This results in a chatbot with reduced accuracy and effectiveness which limits the overall user experience.

SUMMARY

Therefore, what is needed are methods and systems that provide for advanced, dynamic decision-making and response generation in virtual assistant (VA) application software. The techniques described herein beneficially leverage behavior trees, which are a decision-making engine often used in the gaming and robotics industries—but not in the chatbot/VA space. The methods and systems provide for conversation orchestration in VA software that uses behavior trees to drive the VA software's actions and responses. Each node in the behavior tree structure represents a possible VA behavior, with the behavior tree's structure defining how these behaviors relate to each other. The tree is traversed based on customer inputs, allowing the VA software to understand user requests without the need for explicitly defining the intent. This results in a more intelligent, versatile, and effective VA application that can handle a wide range of customer queries and situations, making the software's problem handling much closer to human-like interactions.

The invention, in one aspect, features a computer system for conversation dialogue orchestration in virtual assistant communication sessions. The system includes a server computing device having a memory that stores computer-executable instructions and a processor that executes the computer-executable instructions. The server computing device establishes a chat-based communication session between a virtual assistant application of the server computing device and a client computing device. The virtual assistant application captures an utterance generated by a user of the client computing device during the chat-based communication session. The virtual assistant application processes the utterance to instantiate a dialogue behavior tree comprising a plurality of workflow agents each associated with executable code for completing a corresponding workflow action. The virtual assistant application traverses the dialogue behavior tree to generate a response to the utterance, including for each workflow agent: evaluating one or more conditions associated with the workflow agent to determine whether to execute the code in the workflow agent, and when the conditions associated with the workflow agent are met, executing the code in the workflow agent to complete the workflow action and storing a sub-response associated with the completed workflow action in a dialogue memory. The virtual assistant application coalesces the sub-responses stored in the dialogue memory to generate a final response to the utterance. The virtual assistant application transmitting the final response to the client computing device for display during the chat-based communication session.

The invention, in another aspect, features a computerized method of conversation dialogue orchestration in virtual assistant communication sessions. A server computing device establishes a chat-based communication session between a virtual assistant application of the server computing device and a client computing device. The virtual assistant application captures an utterance generated by a user of the client computing device during the chat-based communication session. The virtual assistant application processes the utterance to instantiate a dialogue behavior tree comprising a plurality of workflow agents each associated with executable code for completing a corresponding workflow action. The virtual assistant application traverses the dialogue behavior tree to generate a response to the utterance, including for each workflow agent: evaluating one or more conditions associated with the workflow agent to determine whether to execute the code in the workflow agent, and when the conditions associated with the workflow agent are met, executing the code in the workflow agent to complete the workflow action and storing a sub-response associated with the completed workflow action in a dialogue memory. The virtual assistant application coalesces the sub-responses stored in the dialogue memory to generate a final response to the utterance. The virtual assistant application transmitting the final response to the client computing device for display during the chat-based communication session.

Any of the above aspects can include one or more of the following features. In some embodiments, processing the utterance to instantiate a dialogue behavior tree comprises rewriting the utterance using a first natural language understanding (NLU) algorithm. In some embodiments, the virtual assistant application creates one or more sub-utterances using the rewritten utterance and extracts an objective comprising one or more of: a topic, a subtopic, a local objective, a dialog act, and an entity from each of the sub-utterances using a second NLU algorithm. In some embodiments, the virtual assistant application analyzes the extracted objectives to determine a context used to instantiate the dialogue behavior tree.

In some embodiments, the virtual assistant application evaluates the one or more conditions associated with a plurality of different workflow agents in parallel during traversal of the dialogue behavior tree. In some embodiments, the virtual assistant application executes the code in a plurality of different workflow agents in parallel during traversal of the dialogue behavior tree.

In some embodiments, the dialogue memory comprises an in-memory data store. In some embodiments, the virtual assistant application stores a bit vector in the dialogue memory during traversal of the dialogue behavior tree, the bit vector comprising a plurality of binary values representing the determination of whether to execute the code in each workflow agent made by the virtual assistant application during traversal of the dialogue behavior tree. In some embodiments, one or more of the workflow agents in the dialogue behavior tree comprises a behavior sub-tree including a plurality of workflow sub-agents each associated with executable code for completing a corresponding workflow action.

In some embodiments, evaluating one or more conditions associated with the workflow agent to determine whether to execute the code in the workflow agent comprises comparing one or more session values for the chat-based communication session against the one or more conditions associated with the workflow agent to determine whether the conditions are met. In some embodiments, the executable code for completing a corresponding workflow action comprises a function call that invokes one or more application resources coupled to the server computing device. In some embodiments, the plurality of workflow agents includes an authentication agent for verifying an identify of a user at the client computing device.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 19 is a diagram of an exemplary funds transfer workflow agent fulfillment sub-tree of a behavior tree.

DETAILED DESCRIPTION

Figure 1:
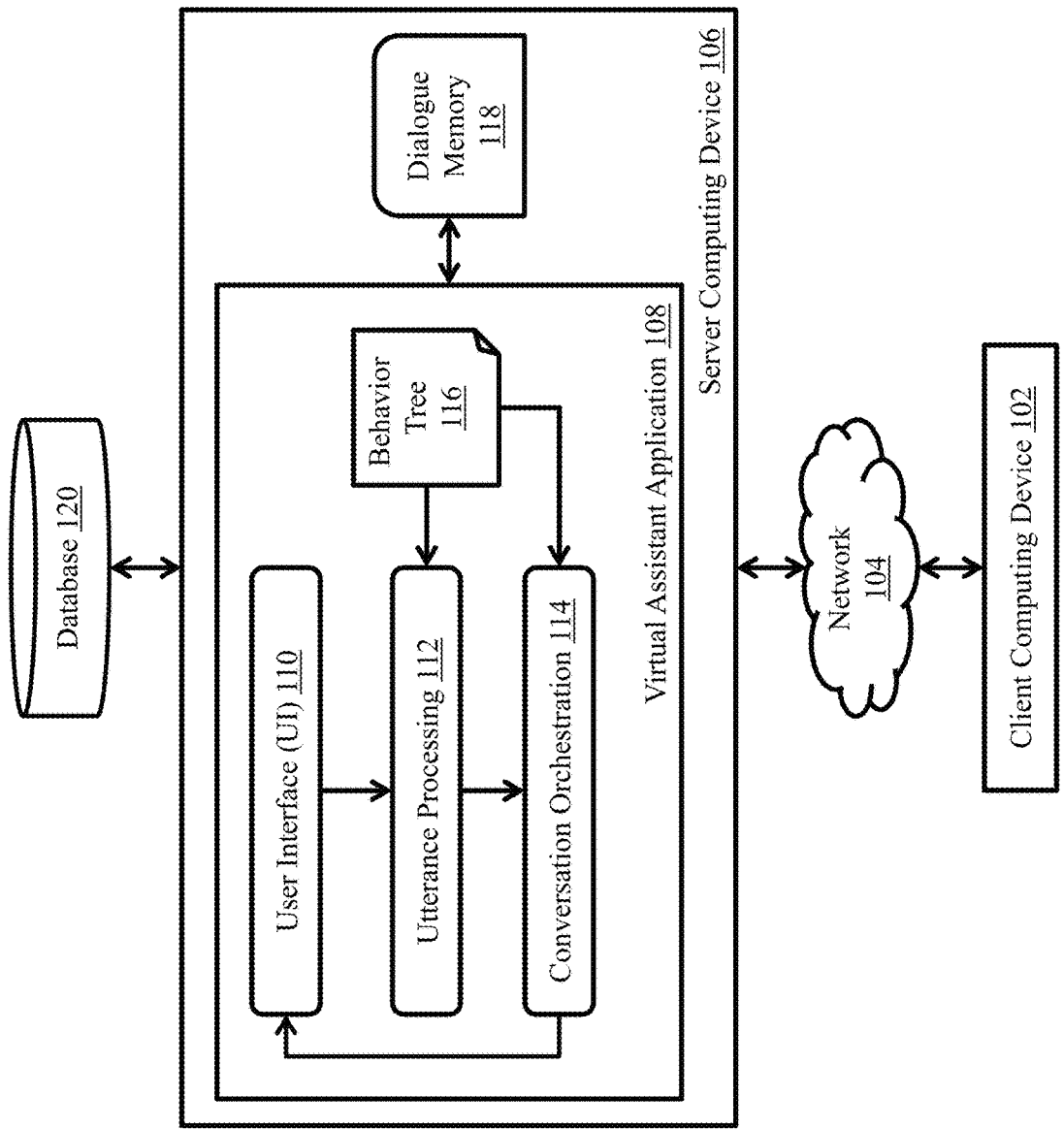
FIG. 1 is a block diagram of a system for conversation dialogue orchestration in virtual assistant communication sessions.

FIG. 1 is a block diagram of a system 100 for conversation dialogue orchestration in virtual assistant communication sessions. System 100 includes client computing device 102, communications network 104, and server computing device 106 that includes virtual assistant (VA) application 108 with user interface (UI) module 110, utterance processing module 112, dialogue orchestration module 114, and behavior tree data structure 116, and dialogue memory 118. System 100 also includes database (DB) 120 coupled to server computing device 106.

Client computing device 102 connects to one or more communications networks (e.g., network 104) in order to communicate with computing device 106 to provide input and receive output relating to one or more chat-based communication sessions as described herein. Exemplary client computing devices 102 include but are not limited to server computing devices, desktop computers, laptop computers, tablets, mobile devices, smartphones, and the like. It should be appreciated that other types of client computing devices that are capable of connecting to the components of the system 100 can be used without departing from the scope of invention. Although FIG. 1 depicts one client computing device 102, it should be appreciated that system 100 can include any number of client computing devices. In some embodiments, client computing device 102 is configured with chat application software, which enables client computing device 102 to establish a chat-based communication session with server computing device 106 via virtual assistant application 108 of server computing device 106.

Communications network 104 enables client computing device 102 to communicate with server computing device 106. Network 104 is typically comprised of one or more wide area networks, such as the Internet and/or a cellular network, and/or local area networks. In some embodiments, network 104 is comprised of several discrete networks and/or sub-networks (e.g., cellular to Internet).

Server computing device 106 is a device including specialized hardware and/or software modules that execute on one or more processors and interact with memory modules (including but not limited to dialogue memory 118) of server computing device 106, to receive data from other components of system 100, transmit data to other components of system 100, and perform functions for conversation dialogue orchestration in virtual assistant communication sessions as described herein. Server computing device 106 includes virtual assistant (VA) application 108 that executes on one or more processors of server computing device 106 and includes UI module 110, utterance processing module 112, and dialogue orchestration module 114. In some embodiments, modules 110, 112, 114 of VA application 108 are specialized sets of computer software instructions programmed onto one or more dedicated processors in server computing device 106.

As can be appreciated, in some embodiments virtual assistant application 108 comprises a conversation service software application (i.e. chatbot) configured to automatically interact with a user at client computing device 102 in order to gather information and/or respond to inquiries. An exemplary conversation service software application can be based upon a natural language processing (NLP) and/or natural language understanding (NLU) architecture which intelligently parses text messages received from client computing device 102 to understand the context of the message(s) (e.g., by identifying topics/subtopics in the message) and how to generate an appropriate response to the message(s). In some embodiments, VA application 108 can establish a chat-based communication session with client computing device 102 to enable the user at client computing device 102 to participate in an automated chat session with VA application 108. In these embodiments, UI module 110 of VA application 108 provides a chat interface for the exchange of messages with client computing device 102. It should be appreciated that the user can interact with VA application 108 using a text-based interface, a voice-based interface, or both. For example, the voice-based interface can leverage Text to Voice (TTV) and Voice to Text (VTT) technologies, enabling users to interact with VA application 108 through spoken commands and receive audible responses. System 100 dynamically adapts between text and voice modes based on user preference, device capability, and context of use, providing a flexible and user-friendly interaction method.

In some embodiments, client computing device 102 includes an application that executes on client computing device 102 to provide certain functionality to an end user. In some embodiments, client computing device 102 can include a native application installed locally on client computing device 102. For example, a native application is a software application (also called an 'app') that written with programmatic code designed to interact with an operating system that is native to client computing device 102 and provide information and application functionality (such as a chatbot interface) to a user of client computing device 102. In the example where client computing device 102 is a mobile device such as a smartphone, the native application software is available for download from an online repository such as, e.g., the Apple® App Store or the Google® Play Store. In some embodiments, the native application includes a software development kit (SDK) module that is executed by one or more processors of client computing device 102. In other embodiments, client computing device 102 can include a browser application that runs on client computing device 102 and connects to one or more other computing devices (e.g., server computing device 106) for retrieval and display of information and application functionality (such as conducting a chat-based communication session with VA application 108). In one example, the browser application enables client computing device 102 to communicate via HTTP or HTTPS with server computing device 106 (e.g., via a URL) to receive website-related content, including one or more webpages, for rendering in the browser application and presentation on a display device coupled to client computing device 102. Exemplary browser application software includes, but is not limited to, Firefox™, Chrome™ Safari™, and other similar software. The one or more webpages can comprise visual and audio content for display to and interaction with a user.

VA application 108 includes a plurality of computing modules-UI module 110, utterance processing module 112, and conversation orchestration module 114—that execute on one or more processors of server computing device 106. In some embodiments, modules 110, 112, 114 are specialized sets of computer software instructions programmed onto one or more dedicated processors in server computing device 106 and can include specifically designated memory locations and/or registers for executing the specialized computer software instructions.

Although modules 110, 112, 114 are shown in FIG. 1 as executing within VA application 108 on server computing device 106, in some embodiments the functionality of modules 110, 112, 114 can be distributed among a plurality of server computing devices. As shown in FIG. 1, server computing device 106 enables modules 110, 112, 114 to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of modules 110, 112, 114 is described in detail throughout the specification.

Behavior tree 116 is a hierarchical and modular data structure used to design and manage the decision-making processes of VA application 108. Behavior tree 116 provides a clear and organized way to define how VA application 108 should handle user inputs and manage conversations, enabling VA application 108 to exhibit complex and adaptive behaviors. In some embodiments, behavior tree 116 is predefined and contains subtrees for modular composition. The behavior tree outlines how an end user's interactions with VA application 108 should be handled step-by-step through the system, hence the term 'orchestration.' When a user interacts with VA application 108, behavior tree 116 evaluates the current conditions to determine the appropriate actions to take. For example, if the condition indicates a live chat request, behavior tree 116 activates a live chat sub-tree, ensuring that specific steps for live chat are executed while avoiding the activation of unrelated sub-trees, such as an account balance transfer sub-tree and its associated actions. While the behavior tree itself is predefined, the behavior tree also has dynamic parts that allow for real-time decision-making and adaptation based on the current context and user inputs. This dynamic capability ensures that VA application 108 can respond appropriately to a wide variety of situations, providing a flexible and robust conversational experience.

In some embodiments, behavior tree 116 contains information that defines a hierarchy of one or more workflow agents for carrying out corresponding workflow actions during a virtual assistant communication session between VA application 108 and client computing device 102. Generally, behavior tree 116 is comprised of a plurality of nodes and relationships that connect each node to one or more other nodes. In some embodiments, at least a portion of the nodes of behavior tree 116 correspond to workflow agents (also called task nodes or leaf nodes) that are associated with executable code (e.g., a function call, a programmatic script, a web artifact, a code module, an API call). Another portion of the nodes of behavior tree 116 correspond to one or more conditions for execution of the code (also called conditional nodes or decorator nodes). Typically, each conditional node is associated with one or more workflow agents such that when a conditional node is evaluated, the output from the conditional node is used to determine whether to execute the code of the corresponding workflow agents.

In some embodiments, nodes in behavior tree 116 can include other types of nodes, including but not limited to, a root node, selector (fallback) nodes and sequence nodes. Generally, selector (fallback) nodes and sequence nodes comprise an ordered list of tasks in the form of references or pointers to workflow agents-typically arranged from left to right in order from 'most favorable' outcome to 'least favorable' outcome. When arriving at a selector node, VA application 108 traverses the tree 116 to each child node according to the ordered list and executes the first child node that does not fail. Typically, a child task node returns one of three status indicators when called from a selector node: 'running' (meaning that the child task node has not finished executing yet), 'success' (meaning that the child task node has successfully completed execution), or 'failure' (all other situations). The selector node only needs one of the child task nodes to return a 'success' status indicator for the selector node itself to return a 'success' indicator. When a child node returns a status of 'running,' VA application 108 stores an indicator associated with the specific child node in local memory so that during the next traversal of the tree, VA application 108 can quickly identify the 'running' node(s) and start there instead of starting from the root node each time. VA application 108 continues with traversal of the behavior tree. When arriving at a sequence node, VA application 108 traverses the tree 116 to each child node according to the ordered list and executes all of the child nodes in sequence (e.g., from left to right). The sequence node needs all of the child task nodes to return a 'success' status indicator for the sequence node itself to return a 'success' indicator.

As will be described in greater detail below, VA application 108 can instantiate a new instance of the behavior tree for use in a virtual assistant communication session with client computing device 102, and application 108 can traverse the nodes of the instantiated behavior tree 116 during the communication session. Upon reaching a particular node, VA application 108 can determine the type of node that is reached, traverse the node and any child nodes according to the node type, evaluate the execution conditions associated with workflow agent(s) of the node(s) to determine whether to execute the corresponding code, and return an output from execution of the agent(s). Typically, execution of the code results in an output that can be stored in memory and used by VA application 108 to determine subsequent node(s) in behavior tree 116 which should be traversed. In some embodiments, a plurality of different behavior trees 116 can be stored in database 120. VA application 108 can connect to database 120 during a virtual assistant communication session and retrieve a particular behavior tree 116 for instantiation, traversal, and execution as described herein.

Dialogue memory 118 is an in-memory data store located on server computing device 106 and coupled to VA application 108. Dialogue memory 118 is configured to provide low latency access to and high availability of data stored therein. In some embodiments, dialogue memory 118 stores data as key-value pairs. In some embodiments, VA application 108 uses dialogue memory 118 to store a bit vector during traversal of behavior tree 116 in a virtual assistant communication session with client computing device 102. The bit vector includes a plurality of binary values (e.g., [0,1,1,0,1,0,1, . . . ]) where each value represents a determination made by behavior tree 116 of whether to execute code in a workflow agent. Taken together, the values in the bit vector can represent a traversal outcome of the behavior tree 116, e.g., for a particular user and/or for a particular conversation session. As will be described in greater detail below, when stored in dialogue memory 118, the bit vectors for a plurality of different users and/or conversation sessions can be advantageously analyzed to provide a real-time interaction tracking utility-identifying particular workflow agents in the behavior tree 116 (and their specific output) that are most frequently retrieved or accessed by users. For example, system administrators can use the bit vectors to identify: the topics or subtopics that are most requested by end users during a specific time period; the top reasons for end users seeking to transition from VA application 108 to a live customer service agent during a session; the frequently asked questions (FAQs) that are most retrieved by end users, and so forth. In another example, system administrators can use the bit vectors to maintain and update a dynamic 'live' leaderboard that shows workflow agents with the heaviest workload (e.g., most traversals, most code executions, etc.) as end users interact with VA application 108. In some embodiments, dialogue memory 118 comprises a Redis™ caching layer that enables in-memory data storage (available from Redis Ltd. of San Francisco, California).

In some embodiments, VA application 108 can leverage Redis' built-in data type: Sorted Set, i.e., key and counter pairs sorted in descending order. For instance, a certain question-and-answer (QnA) pair #127 "How to take loans from my 401k?" has been asked 1,980 times, whereas QnA pair #12 "How to calculate RMD?" has been asked 790 times. Each time a QnA pair is used to answer customer questions, the counter is incremented by 1. With the real-time counting mechanism, a leaderboard can show exactly what is the most asked question or what is the reason that leads to Human Agent escalation, etc. The leaderboard can be maintained and updated on a daily basis, hourly basis, or using another time increment. As can be appreciated, the leaderboard is independent of a specific conversation session, which is associated with each customer interaction.

Database 120 is a computing device (or set of computing devices) coupled to server computing device 106 and configured to receive, generate, and store specific segments of data relating to the process of conversation dialogue orchestration in virtual assistant communication sessions as described herein. In some embodiments, system 100 can include a plurality of databases. In some embodiments, the entire database 120 or a portion of database 120 can be integrated with server computing device 106 or be located on a separate computing device or devices. Database 120 can comprise one or more databases configured to store portions of data used by the other components of system 100, as described throughout the specification.

In some embodiments, system 100 can further include one or more NLP/NLU services (not shown) coupled to server computing device 106. Each NLP/NLU service can comprise a computing resource that is configured to analyze incoming user messages (e.g., utterances received from client computing device 102 as part of a virtual assistant communication session with VA application 108) and provide a determined intent associated with the user utterance (s). As can be appreciated, a main goal of many virtual assistant applications 108 is to parse incoming user utterances, process the messages using an NLP/NLU module to understand the user's input and to determine a user intent for the utterances. Then, based upon the determined user intent, the virtual assistant application 108 can identify a behavior tree or trees to traverse in order to formulate a response to the user utterances (e.g., provides information, answers a question, initiates a transaction, etc.) that satisfies the user intent and continues the conversation flow. In some embodiments, NLP/NLU services can be application programming interfaces (APIs) that are called by VA application 108 using one or more function calls including parameters such as the user utterances. It should be appreciated that NLP/NLU services can be located on server computing device 106 and/or one or more computing devices that are separate from server computing device 106 (e.g., service endpoints, remote servers and the like). Exemplary NLP/NLU services include but are not limited to Google® Dialogflow™, Amazon® Lex™, Microsoft® Azure Bot™, OpenAI™ ChatGPT™ and others. For example, the NLP/NLU services can be proprietary in-house models (e.g., based on one or more open source LLMs trained using organization-specific and/or domain-specific data)—which may promote better security and customization options, while also improving response time. In some embodiments, the NLP/NLU services can utilize advanced machine learning algorithms, such as generative pre-trained transformer models or large language models (LLMs), to evaluate input and generate output.

Figure 2:
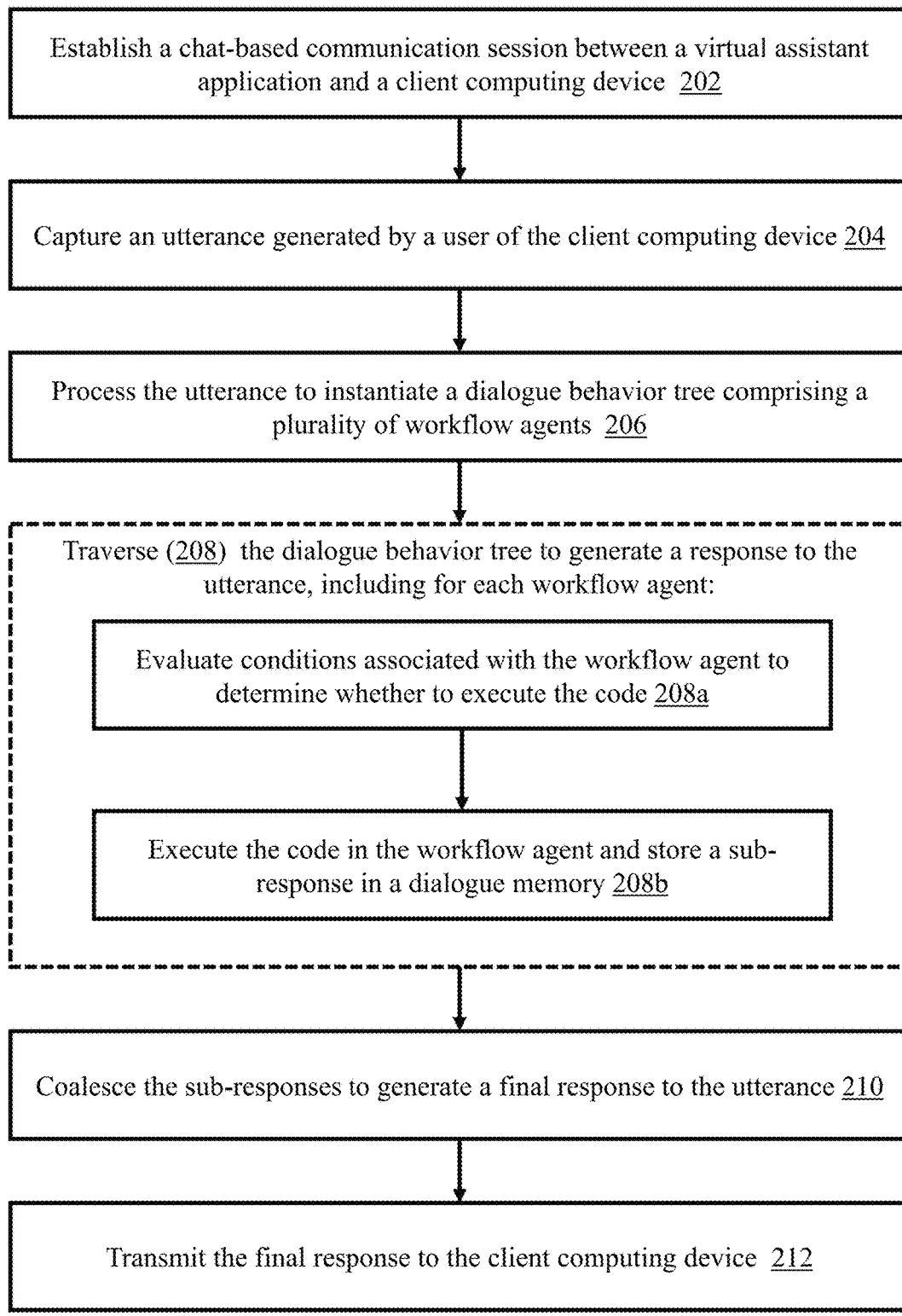
FIG. 2 is a flow diagram of a computerized method of conversation dialogue orchestration in virtual assistant communication sessions.

FIG. 2 is a flow diagram of a computerized method 200 of conversation dialogue orchestration in virtual assistant communication sessions, using system 100 of FIG. 1. A user at client computing device 102 can launch an application (e.g., app, browser) to perform a variety of tasks, including but not limited to information retrieval from local and/or remote data sources. For example, when the application is a browser application, the user can interact with the application to access one or more websites and/or webpages (either internally or externally hosted) in order to view information and submit queries for retrieval of additional information. In one embodiment, the user of client computing device 102 is a customer accessing a company website to retrieve information (e.g., product information, account information, customer service information, and the like).

As can be appreciated, in some instances the information that the customer is seeking may not be readily available or the customer may have additional questions that he or she cannot resolve using only the information provided by the application. In these instances, the customer may want to conduct a chat-based communication session with server computing device 106 via virtual assistant application 108. For example, a customer at client computing device 102 may want to connect to VA application 108 for real-time, automated assistance in resolving a problem, performing a transaction, or answering a question. The customer at device 102 can launch a function in the app and/or activate a link in a webpage displayed in the browser to initiate a network connection (e.g., HTTP) to VA application 108 on server computing device 106.

In some embodiments, at the point when the connection is established between client computing device 102 and VA application 108, a new chat session is created and lasts for a defined period of time (e.g., thirty minutes). During this timeframe, all chat session history is used to resolve the conversation context. The session is per customer per timeframe-similar to a conversation with a person, which could last for thirty minutes or could end earlier. In this context, whichever time period is shorter defines the chat session. A roundtrip in the chat session is defined as (i) the user at client computing device 102 typing/speaking an utterance transmitted to VA application 108 for processing, and (ii) VA application 108 responding to the utterance with an answer. As can be appreciated, during a conversation, often there will be multiple roundtrips. For each roundtrip, VA application 108 instantiates a new instance of behavior tree 116 based on the configuration. Once VA application 108 sends the response out to client computing device 106, the current instance of behavior tree 116 ends. The next roundtrip during the chat session creates another instance of behavior tree 116 for traversal and execution of workflow items. In some embodiments, behavior tree 116 is created based on a configuration and each instance of behavior tree 116 shares the same configuration, so the behavior trees handle user utterances consistently.

Server computing device 106 establishes (step 202) a chat-based communication session with client computing device 102 via virtual assistant application 108. When the session is established, server computing device 106 can transmit one or more messages to client computing device 102 that greet the user and ask the user how VA application 108 can help. The user at client computing device 102 can submit one or more user messages (also called utterances) that relate to the user's reason or purpose for initiating the chat-based communication session. VA application 108 captures (step 204) an utterance generated by the user of client computing device 102 during the chat-based communication session. In some embodiments, VA application 108 receives one or more data packets from client computing device 102 during the chat session that contain user utterances in either packet payload and/or metadata. VA application 108 can extract the user utterances from the data packets as they arrive from client computing device 102 and store the utterances in local memory allocated to the chat session (e.g., session slot(s)).

As can be appreciated, a chat session represents a state-based conversation flow between client computing device 102 and VA application 108, where VA application 108 parses user utterances, carries out one or more workflow actions relevant to the user utterances, and generates appropriate responses. In some embodiments, VA application 108 perform specific workflow actions (e.g., information retrieval, transaction processing) as necessary to generate the responses. As mentioned previously, existing virtual assistant applications often require matching the user utterance to predefined sample utterances in order to identify a potential user intent before determining what action to take in response. Beneficially, through the use of behavior trees for orchestration of a chat session, system 100 can dynamically adapt to the user utterances throughout the chat session without requiring the determination of a specific intent based on matching to predefined utterances.

Utterance processing module 112 processes (step 206) the utterance to instantiate a dialogue behavior tree (e.g., behavior tree 116). In this context, a behavior tree can include one or more task nodes with code that when executed, generates a potentially relevant response to the utterance. In some embodiments, system 100 is configured with a single behavior tree that includes all task nodes in order to handle any different type of utterance that may be presented by an end user, and VA application 108 instantiates different instances of the behavior tree 116 to handle roundtrips during each chat session with each different end user. In some embodiments, system 100 is configured with a plurality of different behavior trees that focus on particular tasks and module 112 can select one of the behavior trees for instantiation based upon, e.g., processing of the utterance as described herein. As mentioned above, the dialogue behavior tree comprises a plurality of workflow agents ('task nodes') each associated with executable code for completing a corresponding workflow action.

Figure 3A:
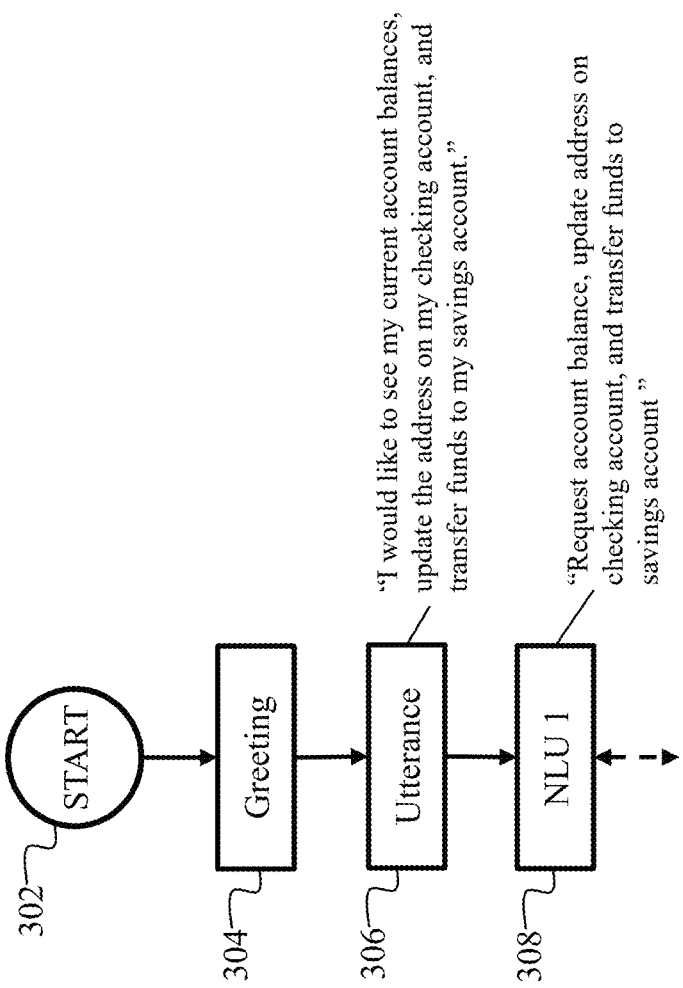
FIG. 3A is a diagram of a first portion of a behavior tree relating to receipt and processing of a user utterance from a client computing device.
Figure 3B:
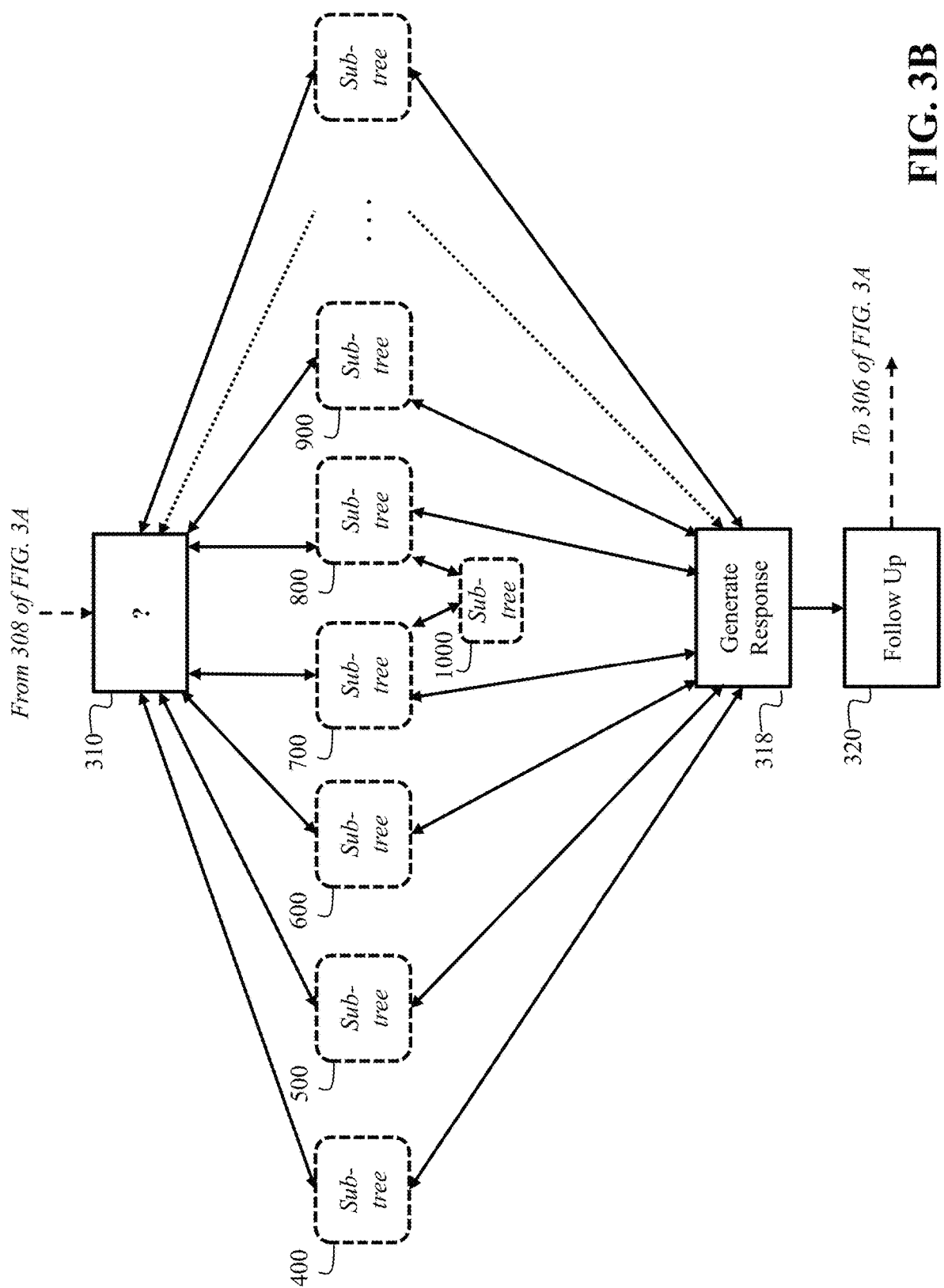
FIG. 3B is a diagram of a second portion of a behavior tree relating to execution of workflow agents for generating a response to a user utterance from a client computing device.

FIGS. 3A-3B comprise a diagram of an exemplary dialogue behavior tree that can be traversed by modules 110, 112, 114 of VA application 108 to generate a response to a user utterance. FIGS. 4-19 comprise detailed portions of the dialogue behavior tree of FIGS. 3A-3B. It should be appreciated that the behavior tree structure depicted in FIGS. 3A-3B and FIGS. 4-19 is merely exemplary and other behavior tree configurations can be used within the scope of the technology described herein. FIG. 3A is a diagram of a first portion of the behavior tree relating to receipt and processing of the user utterance from client computing device 102. Each behavior tree includes a root node to indicate to VA application 108 where traversal of the behavior tree should begin. As shown in FIG. 3A, the root node 302 is labeled 'START.' Upon retrieving the behavior tree, utterance processing module 112 traverses the tree from the root node 302 to a greeting node 304. At greeting node 306, utterance processing module 112 generates an initial message for display to the end user upon establishing the chat session. For example, module 112 can start the chat session by welcoming the user and asking how the VA application 108 can assist. Module 112 then traverses the behavior tree from greeting node 304 to utterance node 306, and module 112 waits for the user at client computing device 102 to submit an utterance in the chat session, in the form of, e.g., a question, a request, or other message. In the example provided in FIG. 3A, the user at client computing device 102 enters the following utterance: "I don't know the difference between growth and value investing. Can you explain both investing styles to me and tell me how they differ?"

Upon receiving the utterance from client computing device 102, utterance processing module 112 traverses the behavior tree to task node 308, which is configured with code for execution of a natural language understanding workflow agent (NLU 1) that analyzes the incoming user utterance (from node 306) and rewrites the utterance into a different form that is ingestible by node 310. As can be appreciated, the initial user utterance may include words, punctuation or syntax that are unneeded or irrelevant to generating a response using VA application 108. NLU 1 node 308 connects to an NLU processor (e.g., an NLP/NLU service as described previously) and provides the initial user utterance as input for generating a rewritten utterance. For example, NLU 1 can be trained on test data containing sample initial utterances and rewritten utterances, so that when NLU 1 receives a new input utterance, NLU 1 can convert the utterance into a rewritten form according to the training phase. Using the example of FIG. 3A, the code in task node 308 can comprise a function or API call that is executed by module 112 to instantiate an NLU service with the utterance received from device 102 ("I don't know the difference between growth and value investing. Can you explain both investing styles to me and tell me how they differ?") as input. In other embodiments, the code in task node 308 can comprise a script, method or other programmatic entity that is executed directly by server computing device 106. Task node 308 processes the utterance and returns a rewritten utterance in the form of "Can you tell me about growth and value investing and how they differ?"

Utterance processing module 112 transmits the rewritten utterance to conversation orchestration module 114 to continue traversal of the behavior tree to node 310 during the chat session. In some embodiments, module 112 instantiates a conversation orchestration handler to manage the conversation workflow and behavior tree traversal for the chat session. In some embodiments, upon executing the code, module 112 launches an instance or thread in conversation orchestration module 114 that is associated with the specific chat session between client device 102 and VA application 108. The instance is configured to monitor the connection and exchange of utterances/responses between device 102 and application 108 and coordinate subsequent traversal of the behavior tree during the session.

FIG. 3B is a diagram of a second portion of the behavior tree relating to execution of workflow agents for generating a response to the user utterance from client computing device 102. Conversation orchestration module 114 traverses the behavior tree from task node 308 of FIG. 3A to selector node 310 of FIG. 3B (identified by the question mark symbol). As shown in FIG. 3B, the behavior tree includes a selector node 310 that is connected to a plurality of sub-trees 400 to 1100, each of which is connected to task node 318. Sub-trees 700 and 800 are connected to another sub-tree 1000. The instance in conversation orchestration module 114 that is associated with the chat session traverses (step 208 of FIG. 2) the behavior tree starting at node 316 by evaluating the child sub-trees 400 to 1100 from left to right according to the structure of the tree.

Module 114 evaluates the status (i.e., 'success,' 'running,' 'failure') of the child node, and stops traversal when a first one of the children returns 'success.' In the example of FIG. 3B, the child 'nodes' of selector node 310 each comprises its own sub-tree 400 to 1100 with a plurality of nodes and in some cases, additional sub-trees within. During traversal of the behavior tree, conversation orchestration module 114 processes the nodes in sub-trees 400 to 1100 to generate sub-response(s). For example, where a sub-tree comprises a sequence node with a corresponding child conditional node and child task node, module 114 evaluates (step 208a of FIG. 2) one or more conditions defined in the conditional node to determine whether to execute the code in the workflow agent of the task node. When the conditions defined in the conditional node are met, conversation orchestration module 114 executes (step 208b) the code in the workflow agent of the task node to complete the corresponding workflow action and store a sub-response associated with the completed workflow action in dialogue memory 118. Each of the sub-trees 400 to 1400 is described in greater detail below.

Depending upon the result of evaluation and execution of the sub-trees 400 to 1100, conversation orchestration module 114 reaches task node 318 and coalesces (step 210) responses or sub-responses generated from the sub-trees to generate a final response to the user utterance. Then, module 116 reaches task node 320 and transmits (step 212) the final response to the client computing device 102 for display to the end user during the chat-based communication session.

Figure 4:
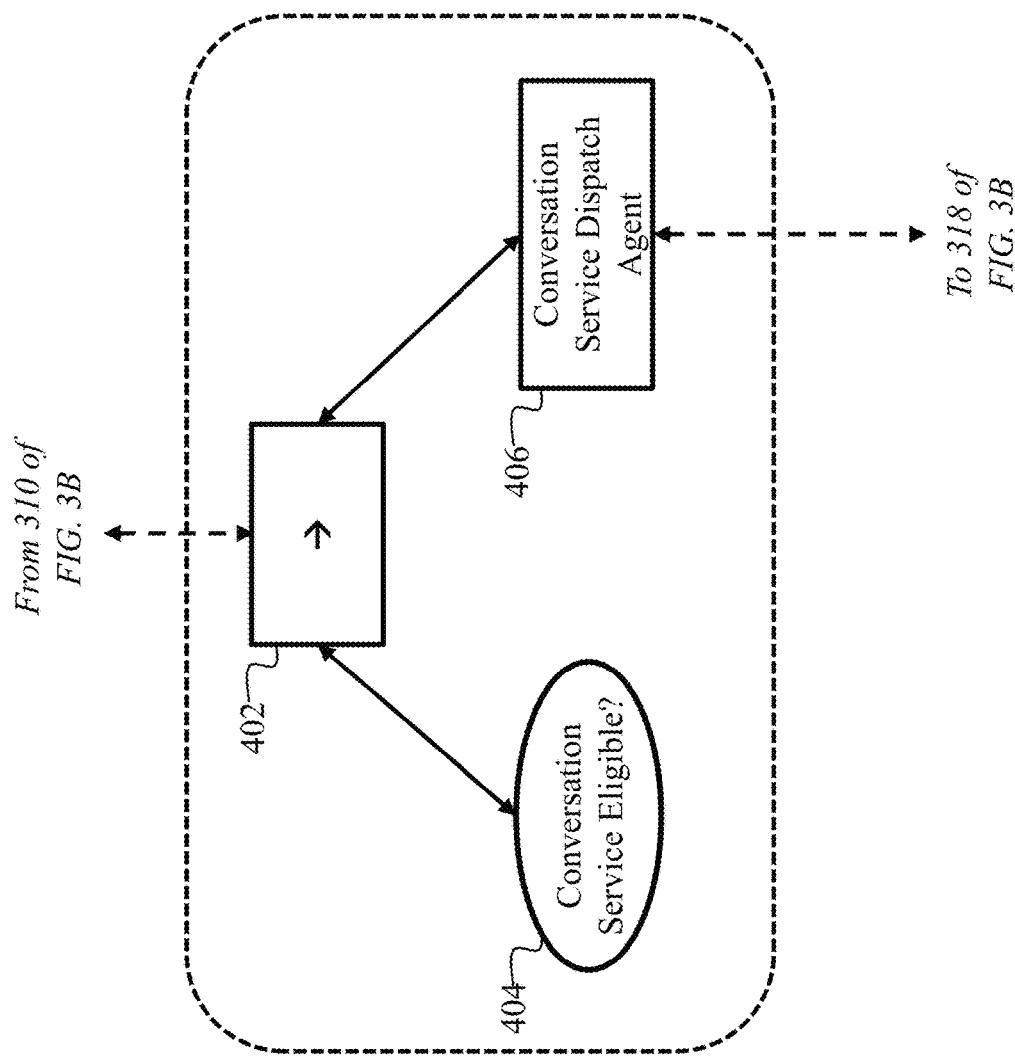
FIG. 4 is a diagram of an exemplary conversation service dispatch sub-tree of a behavior tree.

In the example described above, conversation orchestration module 114 traverses the tree to child sub-tree 400 because it is the arranged as the leftmost child of node 310. FIG. 4 is a diagram of an exemplary conversation service dispatch sub-tree 400 of behavior tree 116. Child sub-tree 400 includes sequence node 402 (identified by the arrow symbol) with two sub-nodes: conditional node 404 and conversation service dispatch agent task node 406. As described previously, when evaluating a sequence node (e.g., node 402), module 114 traverses to each child node from left to right, evaluates the status of each child node, and requires that all children return a status of 'success' in order for the sequence node 402 to be successful. In the example shown in FIG. 4, module 114 traverses to conditional node 404 because it is arranged as the leftmost child of sequence node 402.

Module 114 evaluates the condition(s) defined in conditional node 404 to determine the status. For example, node 404 includes a condition of whether the chat session is conversation service eligible, meaning that a separate conversation service application is eligible to handle the chat session with the end user. The condition can be evaluated based upon the utterance (e.g., certain syntax or keywords may suggest that the separate conversation service application is appropriate) and/or by evaluating one or more attributes of user profile information associated with the user at client computing device 102. For example, the user may be a returning customer who has previously interacted with a different conversation service application and/or the user has one or more characteristics (e.g., net worth, geographic location, etc.) that are better handled by the separate conversation service application. Upon establishing the chat session between VA application 108 and client computing device 102, UI module 110 can identify the end user using certain indicia (e.g., username, password, date of birth, account number, device IP address, etc.) received from device 102. UI module 110 can then retrieve corresponding user profile information from database 120 and transmit the user profile information to utterance processing module 112 and/or conversation orchestration module 114. The user profile information may indicate that chat sessions established with this particular user are suitable for handling by the separate conversation service application and/or the user has opted in to participating in chat sessions with the separate conversation service application.

When the condition in node 404 is satisfied, module 114 traverses to the next child node (i.e., task node 406) for execution. Conversation service dispatch agent task node 406 is configured with programmatic code to establish a connection from VA application 108 to the separate conversation service application to assume control of the chat session. Returning to FIG. 3B, module 114 evaluates selector node 310, determines that sub-tree 400 returned 'success' and stops traversal of the remaining sub-trees 500 to 1100 in FIG. 3B. Module 114 traverses the behavior tree to generate response task node 318, executes code to generate a response (e.g., a text message such as "You are now being transferred to a different chatbot to continue your conversation"), and transmits the response to client computing device 102 for display to the user.

Figure 5:
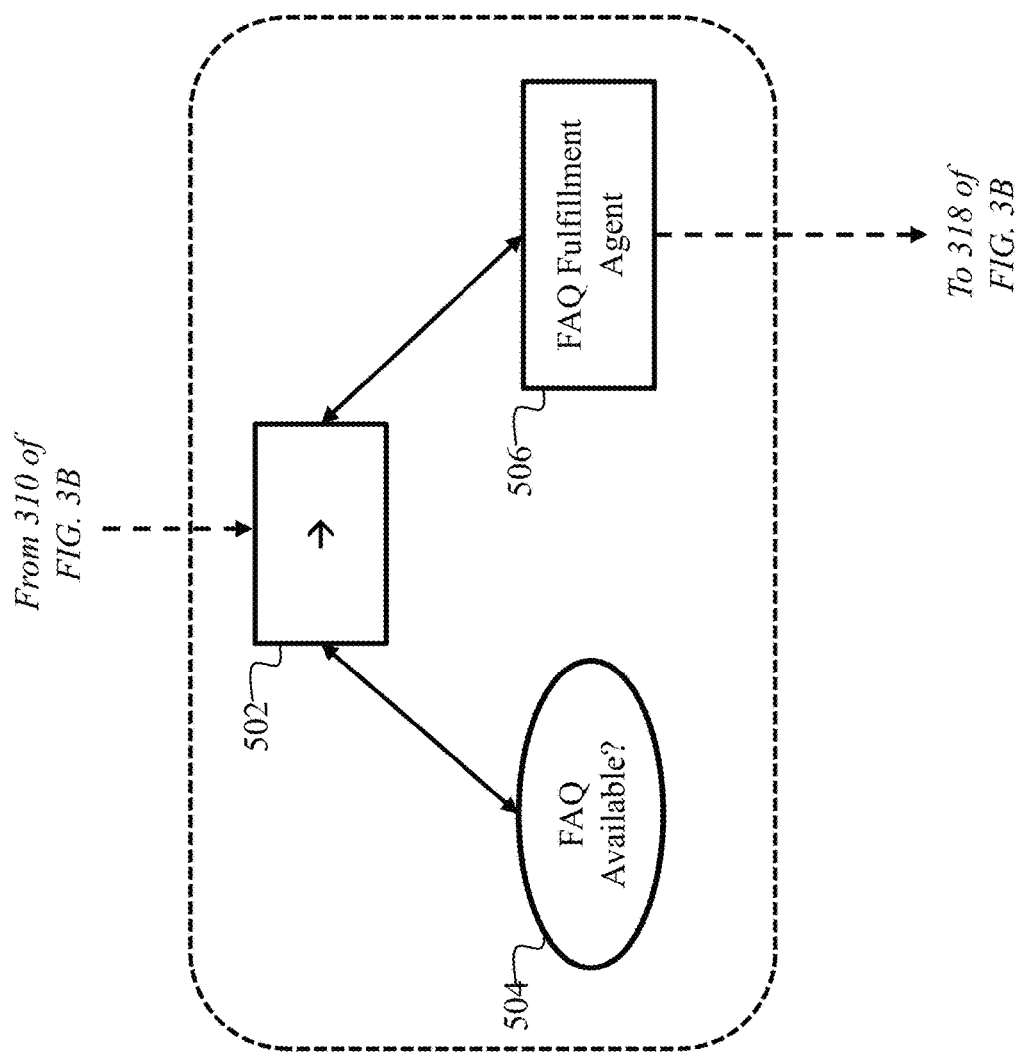
FIG. 5 is a diagram of an exemplary frequently asked questions (FAQ) fulfillment sub-tree of a behavior tree.

In the event that sub-tree 400 returns a status of 'failure' or 'running,' conversation orchestration module 114 traverses from selector node 310 to sub-tree 500. FIG. 5 is a diagram of an exemplary frequently asked questions (FAQ) fulfillment sub-tree 500 of behavior tree 116. As shown in FIG. 4, sub-tree 500 comprises sequence node 502 with child conditional node 504 and child task node 506. Upon reaching conditional node 504, conversation orchestration module 114 evaluates the condition of whether a FAQ document responsive to the utterance is available. For example, module 114 can search for one or more FAQ documents in database 120 that are similar to the utterance, sub-utterance, or objective (e.g., using a similarity measure such as keyword matching, nearest neighbor, text weighting) and when at least one FAQ document is found, module 114 can evaluate the condition of node 504 as being met (i.e., having a status of 'success'). Then, module 114 executes code associated with FAQ fulfillment agent node 506 which, e.g., retrieves the located FAQ document(s) and generates a responsive message that contains summary text and/or links for each of the FAQ document(s) for storage in memory 118. Generation of the responsive message results in a status of 'success' for node 406. Because nodes 504 and 506 both have a status of 'success,' sequence node 502 also resolves to a 'success' status. Returning to FIG. 3B, module 114 evaluates selector node 310, determines that sub-tree 500 returned 'success' and stops traversal of the remaining sub-trees 600 to 1100. Module 114 traverses the behavior tree to task node 318 and executes code to generate a response using the FAQ document text/links stored in memory 118 and transmits the response to client computing device 102 for display to the user.

Figure 6:
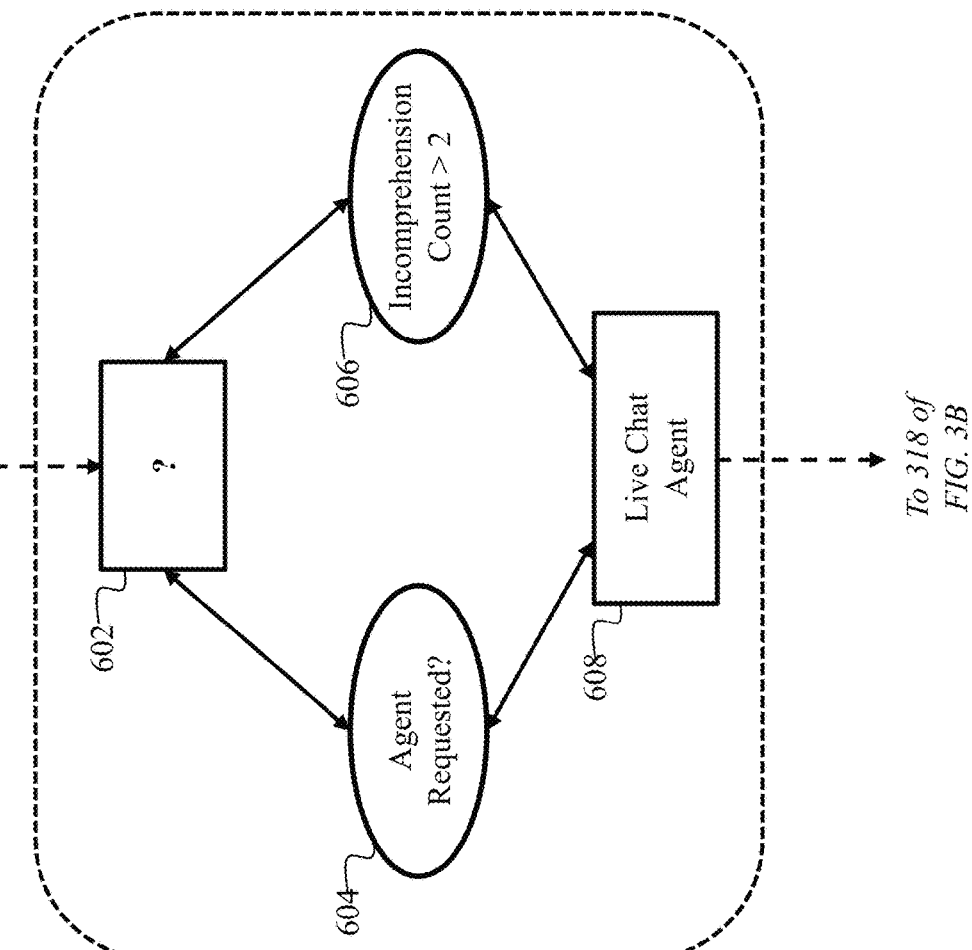
FIG. 6 is a diagram of an exemplary live chat agent fulfillment sub-tree of a behavior tree.

Continuing with FIG. 3B, conversation orchestration module 114 can traverse the other sub-trees 600 to 1100 of the behavior tree as necessary to generate a response to the user utterance. FIG. 6 is a diagram of an exemplary live chat agent fulfillment sub-tree 600 of behavior tree 116. As shown in FIG. 6, sub-tree 600 comprises selector node 602 with two child conditional nodes 604 and 606 that are each connected to child task node 608. Upon reaching selector node 604, conversation orchestration module 114 traverses to conditional node 604 and evaluates the condition of whether the utterance relates to a user request for a live chat agent (and to stop conversing with the VA application 108). For example, the user at client computing device 102 may prefer to speak directly with a live customer service agent in the chat session instead of VA application 108. Module 114 can analyze the utterance, sub-utterance, or objective using, e.g., a NLP/NLU service to determine that the user has requested transfer to a live chat agent. If true, then the condition of node 604 is met, the status of node 604 is 'success,' and module 114 continues traversing the sub-tree 600 to task node 608. In this case, module 114 does not traverse to node 606 because node 602 is a selector node and node 604 has already returned a status of 'success.' Then, module 114 executes code associated with live chat agent node 608 which, e.g., invokes a connection from VA application 108 to a remote computing device of a customer service agent for participation in the chat session. Alternatively, if the user has not requested transfer to a live chat agent (thereby returning a status of 'failure' from node 604), conversation orchestration module 114 can evaluate the condition of node 606 which assesses whether the user utterance is incomprehensible (meaning the VA application 108 cannot interpret the utterance to generate a sub-utterance and/or objective). As shown in FIG. 6, VA application 108 can store an incomprehension count (e.g., in dialogue memory 118) for the current state of the chat session that is incremented each time a user utterance is not understood or is not interpretable. In this example, when the incomprehension count is greater than two, conversation orchestration module 114 evaluates the condition of node 606 as being met and traverses sub-tree 600 to task node 608 for connecting to a live chat agent as described above. Returning to FIG. 3B, module 114 evaluates selector node 310, determines that sub-tree 600 returned 'success' and stops traversal of the remaining sub-trees 700 to 1100. Module 114 traverses the behavior tree to task node 318 and executes code to generate a response (e.g., a text message such as "You are now being transferred to a customer service representative to continue your conversation") and transmits the response to client computing device 102 for display to the user.

Figure 7:
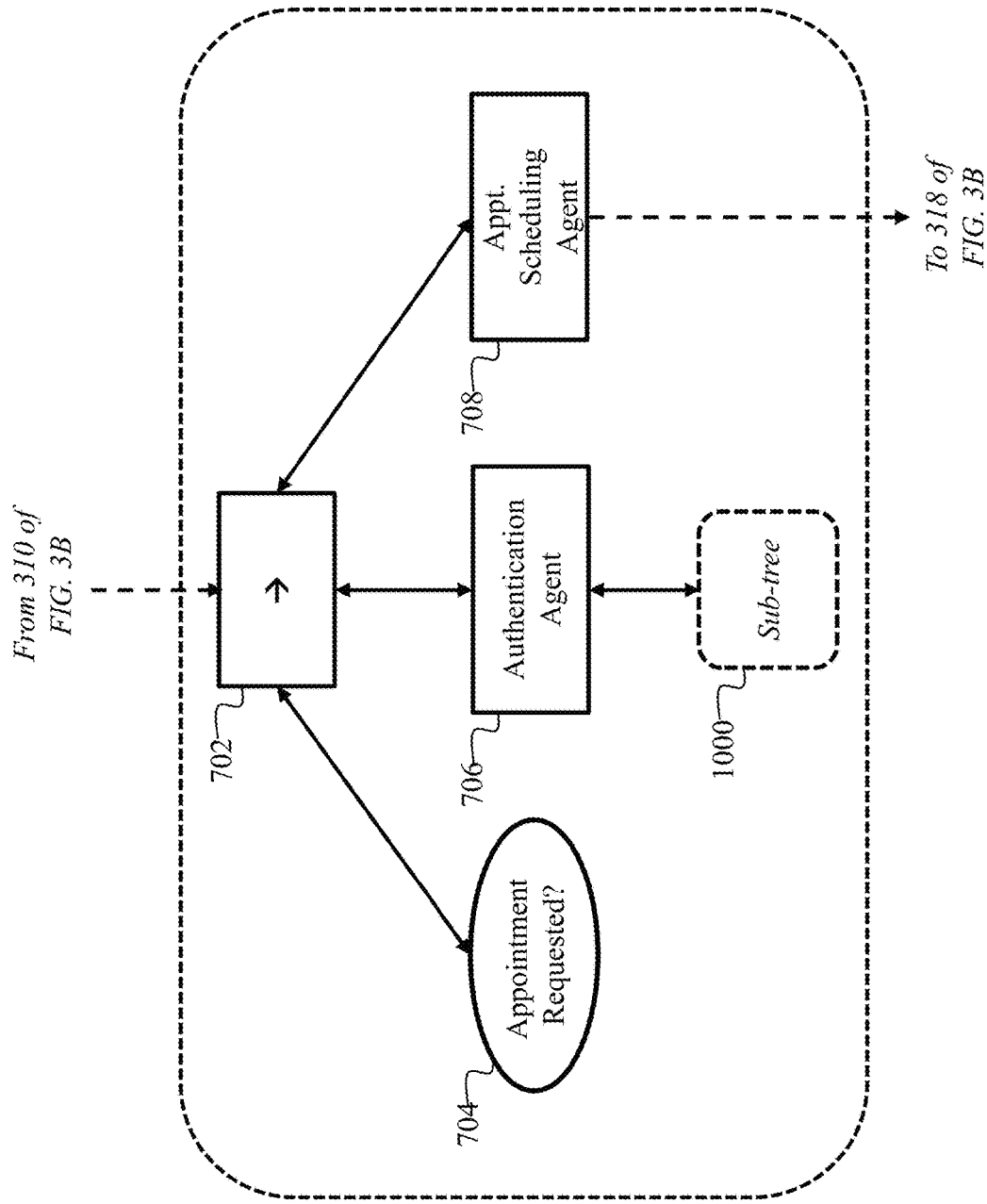
FIG. 7 is a diagram of an exemplary appointment scheduling fulfillment sub-tree of a behavior tree.

FIG. 7 is a diagram of an exemplary appointment scheduling fulfillment sub-tree 700 of behavior tree 116. As shown in FIG. 7, sub-tree 700 comprises sequence node 702 with three children: conditional node 704 and task nodes 706 and 708. Task node 706 is further connected to sub-tree 1000 (see FIG. 10). Upon reaching sequence node 702, conversation orchestration module 114 traverses to conditional node 704 and evaluates the condition of whether the utterance relates to a user request for an appointment. For example, the user may wish to schedule a live (or virtual) meeting with a customer service representative (and to stop conversing with the VA application 108). Module 114 can analyze the utterance, sub-utterance, or objective using, e.g., an NLP/NLU service to determine that the user has requested an appointment. If true, then the condition of node 704 is met, the status of node 704 is 'success,' and module 114 continues traversing the sub-tree 700 to task node 706. Then, module 114 executes code associated with authentication agent node 706 which, in turn, causes module 114 to traverse to sub-tree 1000 of FIG. 10 (described below) for execution of the authentication procedure. For example, module 114 can establish a connection to an authentication server cluster hosted on a separate computing device for purposes of authenticating the end user. Assuming that the user is successfully authenticated, node 706 returns a status of 'success' and module 114 traverses sub-tree 700 to task node 708. Then, conversation orchestration module 114 executes code associated with appointment scheduling agent 708 to schedule an appointment for the user. For example, module 114 can issue an API call to a customer relationship management (CRM) software platform hosted by a separate computing device to request one or more available appointment times from a scheduler. Then, module 114 can store the available appointment times in dialogue memory 118 and generate a response (e.g., a listing of the available times with a message for the user to select a convenient appointment time) and transmits the response to client computing device 102 for display to the user.

Figure 8:
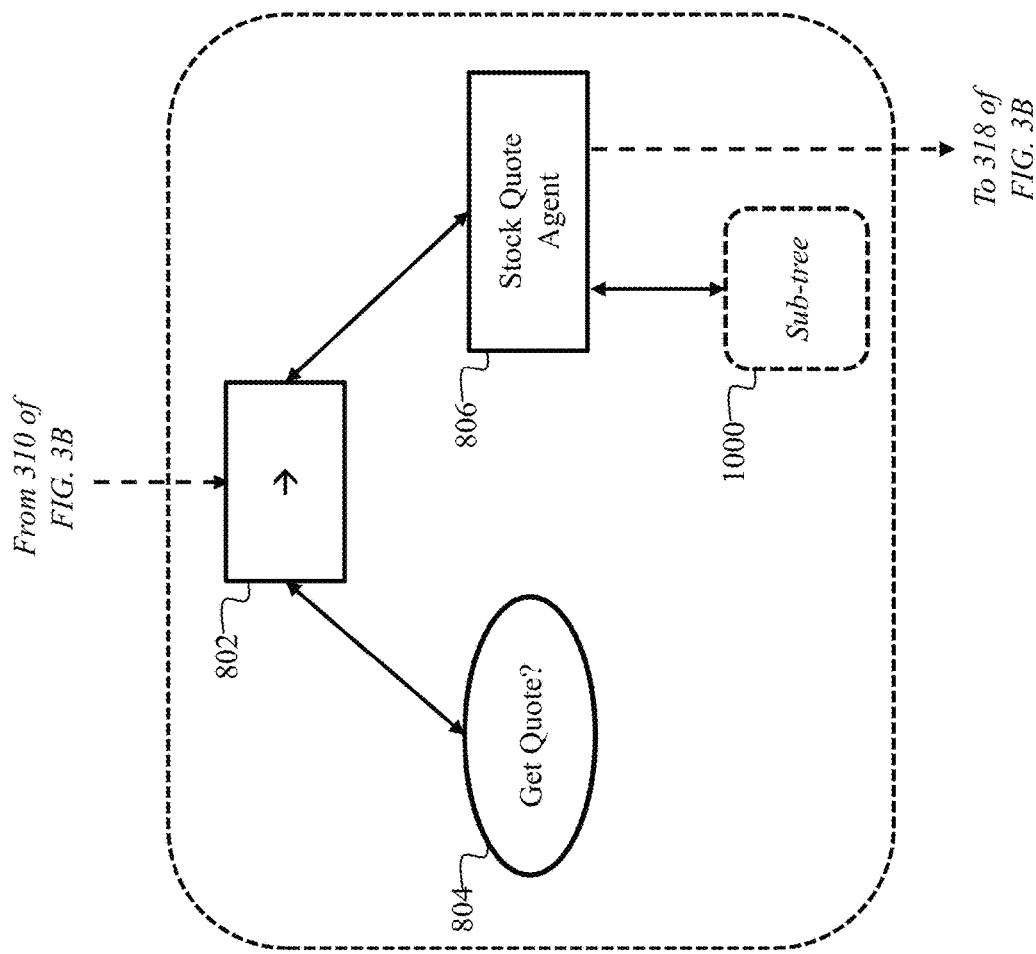
FIG. 8 is a diagram of an exemplary stock quote agent fulfillment sub-tree of a behavior tree.

FIG. 8 is a diagram of an exemplary stock quote agent fulfillment sub-tree 800 of behavior tree 116. As shown in FIG. 8, sub-tree 800 comprises sequence node 802 with child conditional node 804 and child task node 808. Upon reaching sequence node 804, conversation orchestration module 114 traverses to conditional node 804 and evaluates the condition of whether the utterance relates to a user request for a stock quote. For example, the user at client computing device 102 may enter an utterance of "Please show me a quote for 100 shares of IBM stock at current market value." Module 114 can analyze the utterance, sub-utterance, or objective using, e.g., an NLP/NLU service to determine that the user has requested the stock quote. If true, then the condition of node 804 is met, the status of node 804 is 'success,' and module 114 continues traversing the sub-tree 800 to task node 806. Then, module 114 executes code associated with stock quote agent 806 which first traverses to authentication sub-tree 1000 of FIG. 10 (described below) for execution of the authentication procedure. For example, module 114 can establish a connection to an authentication server cluster hosted on a separate computing device for purposes of authenticating the end user. Assuming that the user is successfully authenticated, module 114 executes code associated with stock quote workflow agent node 806 which, e.g., issues an API call from VA application 108 to a remote computing device (e.g., a data feed server) to request the current market price for IBM stock and calculates the quote based upon the retrieved price. Returning to FIG. 3B, module 114 evaluates selector node 310, determines that sub-tree 800 returned 'success' and stops traversal of the remaining sub-trees 900 to 1100. Module 114 traverses the behavior tree to task node 318 and executes code to generate a response (e.g., a text message such as "100 shares of IBM stock is currently priced at $21,000") and transmits the response to client computing device 102 for display to the user.

Figure 9:
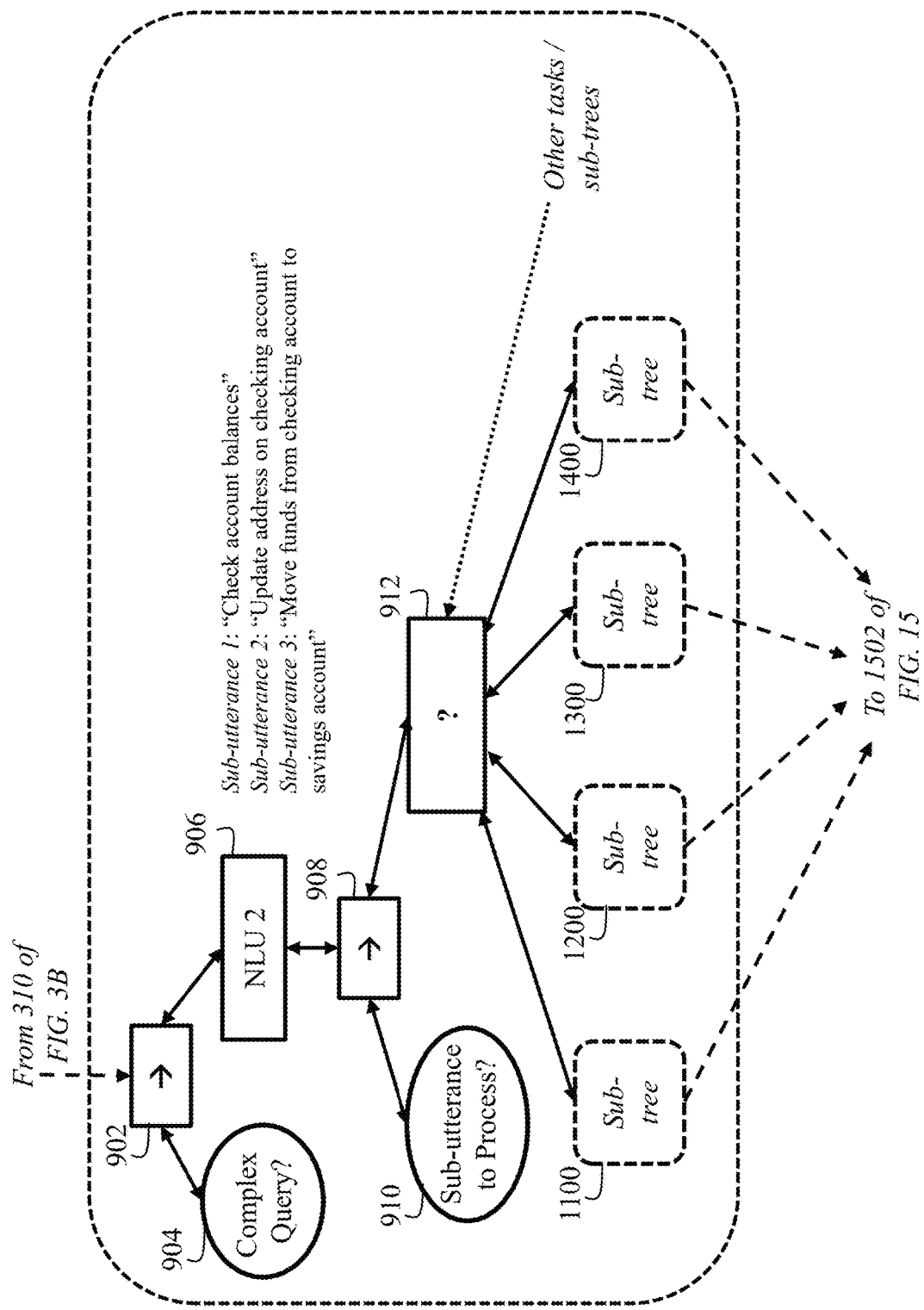
FIG. 9 is a diagram of a first portion of an exemplary multi-agent fulfillment sub-tree of a behavior tree.

Continuing with FIG. 3B, conversation orchestration module 114 can traverse the behavior tree to sub-tree 900 when the previous sub-trees 400 to 800 return a 'failure' status. FIG. 9 is a diagram of a first portion of an exemplary multi-agent fulfillment sub-tree 900 of behavior tree 116. Sub-tree 900 starts with a sequence node 902 with two child nodes: conditional node 904 and task node 906. Module 114 traverses to conditional node 904 and evaluates the condition of whether the utterance comprises a complex query that needs further processing before a sufficient response can be generated. In some embodiments, an initial user utterance or a rewritten user utterance may include several different questions or topics that may or may not be related. In order to generate a response or responses that address each topic, conversation orchestration module 114 can determine that the utterance is complex (e.g., the utterance comprises more than one topic/sub-topic/objective) and use another NLU processing function (NLU 2) to further parse the utterance.

Module 114 can analyze the utterance using, e.g., an NLP/NLU service to determine that the utterance is complex. For example, the NLP/NLU service may analyze the utterance using a semantic interpreter or generative pre-trained transformer to determine that the structure (e.g., length) and/or content (e.g., word choice, subject matter) of the utterance should be classified as complex. If true, then the condition of node 904 is met, the status of node 904 is 'success,' and module 114 continues traversing the sub-tree 900 to task node 906.

Task node 906 is configured with code for execution of another natural language understanding workflow agent (NLU 2) that analyzes the rewritten user utterance from node 308, creates one or more sub-utterances using the rewritten utterance, and extracts one or more objectives from each of the sub-utterances. In some embodiments, an objective can comprise one or more of: a topic (e.g., "Investing"), a subtopic (e.g., "Growth Investing"), a local objective (e.g., "get account balance"), a dialog act (e.g., "schedule appointment"), and an entity (e.g., "Acme Corp."). Using the example from FIG. 3A, upon execution, task node 906 converts the rewritten utterance produced by node 308 into three sub-utterances: 1) "What is growth investing?"; 2) "What is value investing?"; and 3) "How do growth and value investing differ?" For each sub-utterance, task node 906 generates an objective-which can be a subtopic ("Growth Investing," "Value Investing," "Difference in Investing Types"). In some embodiments, conversation orchestration module 114 stores the utterances, sub-utterances, and/or objectives in local memory associated with the chat session (such as a session slot). In some embodiments, module 114 processes each sub-utterance through the remainder of sub-tree 900 one at a time and store the response(s)/sub-response(s) in local memory (e.g., dialogue memory 118). It should be appreciated that in some embodiments, module 114 can traverse sub-tree 900 for each sub-utterance separately and in parallel with each other. Module 114 can then store response(s) and/or sub-response (s) generated from execution of the workflow agents in each traversal in local memory (e.g., dialogue memory 118).

After generating the sub-utterances, conversation orchestration module 114 traverses sub-tree 900 to sequence node 908 which has two child nodes: conditional node 910 and selector node 912. Module 114 traverses to conditional node 910 and evaluates the condition of whether there are additional sub-utterances that still need to be processed through sub-tree 900. If true, module 114 traverses to selector node 912 which is connected to a plurality of workflow agent sub-trees 1100, 1200, and 1300 which are described in more detail below. Because node 912 is a selector node, module 114 traverses to the sub-trees 1100, 1200, 1300 from left to right as arranged in the structure of sub-tree 900. When a first one of the sub-trees 1100, 1200, 1300 returns a status of 'success,' module 114 stops traversal of the remaining sub-trees (if any), stores applicable responses in memory 118, traverses the behavior tree to task node 318 and executes code to generate a response based upon the work performed by sub-trees 1100, 1200 or 1300. Module 114 then transmits the response to client computing device 102 for display to the user.

Figure 10:
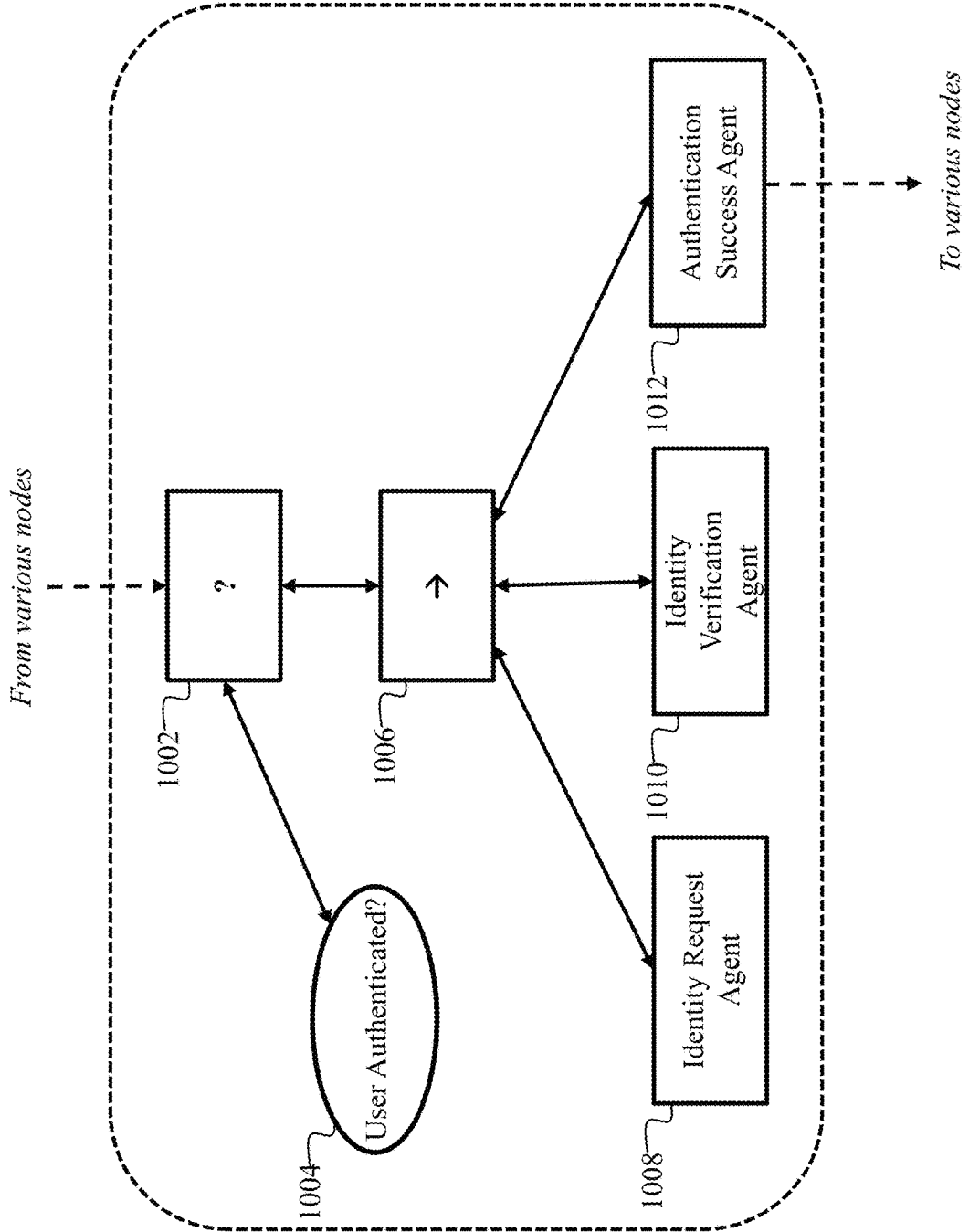
FIG. 10 is a diagram of an exemplary authentication workflow agent sub-tree of a behavior tree.

As described above, some nodes or sub-trees in the behavior tree are connected to authentication sub-tree 1000 for the purpose of confirming the identity of the user at client computing device 102 prior to executing one or more workflow agents. This can be especially useful when the actions performed by the workflow agents and/or the information processed by the workflow agents is of a sensitive or confidential nature, such as financial information or personally identifiable information. FIG. 10 is a diagram of an exemplary authentication workflow agent sub-tree 1000 of behavior tree 116. As shown in FIG. 10, sub-tree 1000 starts with a selector node 1002 that is coupled to a child conditional node 1004 and a child sequence node 1006. Conversation orchestration module 114 traverses to conditional node 1004 and evaluates whether the user at client computing device 102 is already authenticated. For example, the user may have provided authentication credentials at the time of establishing the chat session with VA application 108. Prior to starting the conversation, VA application 108 can be configured to validate the authentication credentials and confirm the identity of the user. VA application 108 can store indicia of authentication in, e.g., a session slot so that subsequent workflow agents in the behavior tree can refer to the indicia to confirm authentication instead of re-executing the authentication routine. Module 114 can check the authentication indicia in storage to evaluate the condition in node 1004. When the user has already been properly authenticated, the condition of node 1004 can resolve to 'true' and the status of node 1004 is 'success.' Because node 1002 is a selector node, module 114 does not continue with traversal of the remaining nodes in FIG. 10 due to the 'success' status of conditional node 1004. In cases where the user is not authenticated, the status of node 1004 is 'failure' and module 114 continues with traversal of sub-tree 1000, proceeding to sequence node 1006 which has three workflow agent nodes 1008, 1010, and 1012 as children.

Conversation orchestration module 114 traverses to each child task node 1008, 1010, and 1012 from left to right for execution. Each of these child task nodes must return a 'success' status in order for authentication to be successful. Module 114 executes code associated with identity request workflow agent node 1008 which, e.g., issues a request for authentication credentials to client computing device 102. In some embodiments, the request can solicit input (e.g., username, password, PIN) to be entered by the user. In some embodiments, the request can comprise a two-factor authentication (2FA) message that provides a sequence of digits (e.g., via alert or text message) to another computing device of the user, and requests that the user enter the digits into a user interface on client computing device 102. In some embodiments, the request can solicit biometric data from the user (e.g., face scan, retina scan, fingerprint scan). Task node 1008 transmits the authentication credentials to identity verification workflow agent task node 1010 for processing. Module 114 executes code associated with task node 1010 which, e.g., establishes a secure connection to an authentication server cluster and provides the authentication credentials to the server cluster, which analyzes the credentials to confirm both the authenticity of the credentials and the identity of the user. The authentication server cluster returns a response to module 114 with a result of the authentication analysis—e.g., valid or invalid. When the credentials are validated, task node 1010 returns a status of 'success' and module 114 traverses to authentication success workflow agent task node 1012. Module 114 executes code associated with task node 1012 to generate a message to the node or sub-tree that called the authentication sub-tree to indicate the result of the authentication processing.

Figure 11:
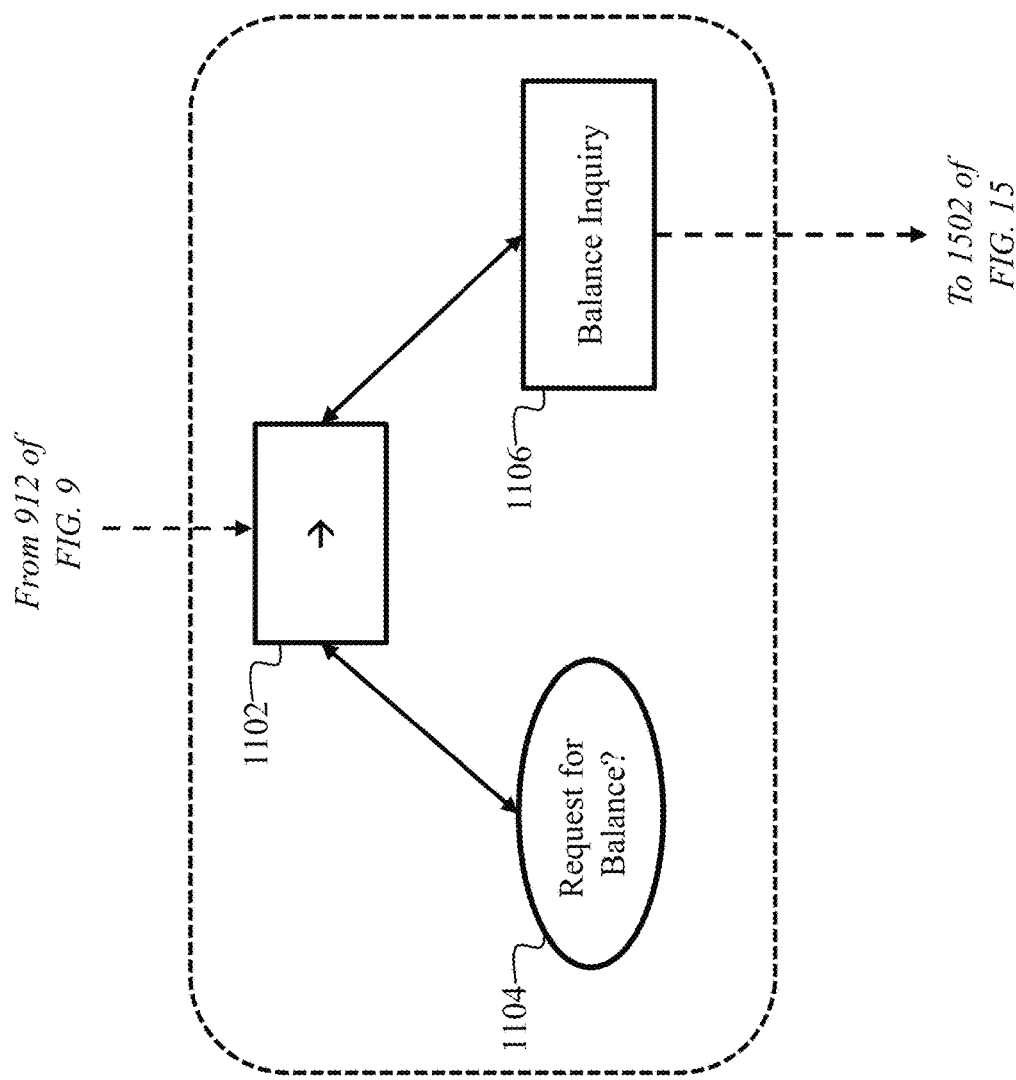
FIG. 11 is a diagram of an exemplary balance inquiry sub-tree of a behavior tree.

Turning back to FIG. 9, selector node 912 is connected to a plurality of sub-trees 1100, 1200, 1300, 1400, and 2000. FIG. 11 is a diagram of an exemplary balance inquiry sub-tree 1100 of behavior tree 116. Sub-tree 1100 starts with sequence node 1102 which has two children: conditional node 1104 and task node 1106. Module 114 traverses to conditional node 1104 and evaluates the defined condition (i.e., determining whether the utterance/sub-utterance comprises a user request for current balance in one or more accounts) in conditional node 1104. For example, module 114 can analyze the content of the sub-utterance and determine that the user has asked for an account balance. Therefore, the status of conditional node 1104 is set to 'success' and module 114 traverses to task node 1106. In this example, balance inquiry task node 1106 includes code that, when executed, sets a balance inquiry flag in dialogue memory 118. The balance inquiry flag denotes that the user has requested an account balance and conversation orchestration module 114 can reference the balance inquiry flag during traversal of subsequent node(s) in behavior tree to trigger other workflow agent(s) that carry out the balance inquiry transaction (as will be described below). Module 114 then traverses the behavior tree to node 1502 of FIG. 15.

Figure 12:
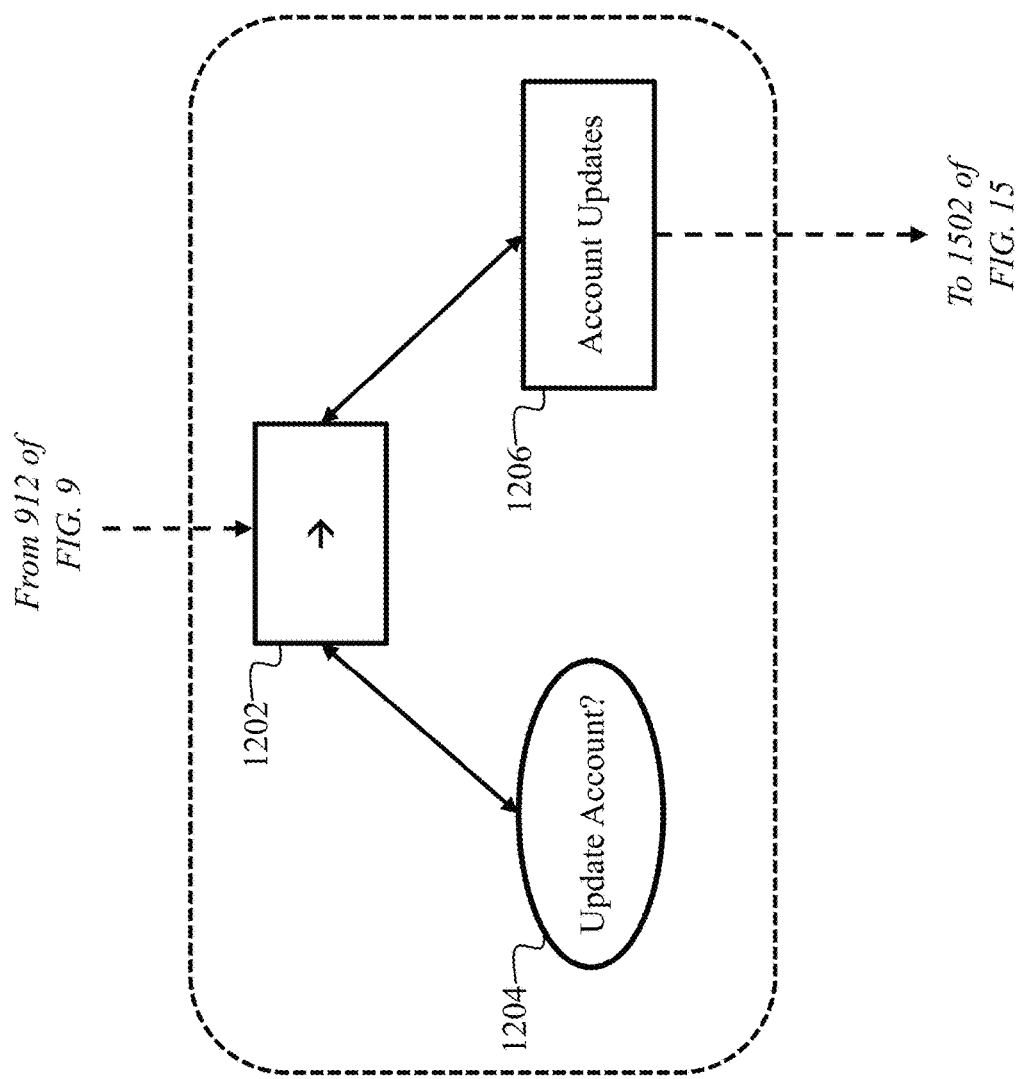
FIG. 12 is a diagram of an exemplary account update sub-tree of a behavior tree.

FIG. 12 is a diagram of an exemplary account update sub-tree 1200 of behavior tree 116. Sub-tree 1200 starts with sequence node 1202 which has two children: conditional node 1204 and task node 1206. Module 114 traverses to conditional node 1204 and evaluates the defined condition (i.e., determining whether the utterance/sub-utterance comprises a user request to update information associated with accounts) in conditional node 1104. For example, module 114 can analyze the content of the sub-utterance and determine that the user has indicated that changes need to be made to their account information (e.g., mailing address, beneficiaries, etc.). Therefore, the status of conditional node 1204 is set to 'success' and module 114 traverses to task node 1206. In this example, account updates task node 1206 includes code that, when executed, sets an account update flag in dialogue memory 118. The account update flag denotes that the user has requested to perform an account update and conversation orchestration module 114 can reference the account update flag during traversal of subsequent node(s) in behavior tree to trigger other workflow agent(s) that carry out the account update transaction (as will be described below). Module 114 then traverses the behavior tree to node 1502 of FIG. 15.

Figure 13:
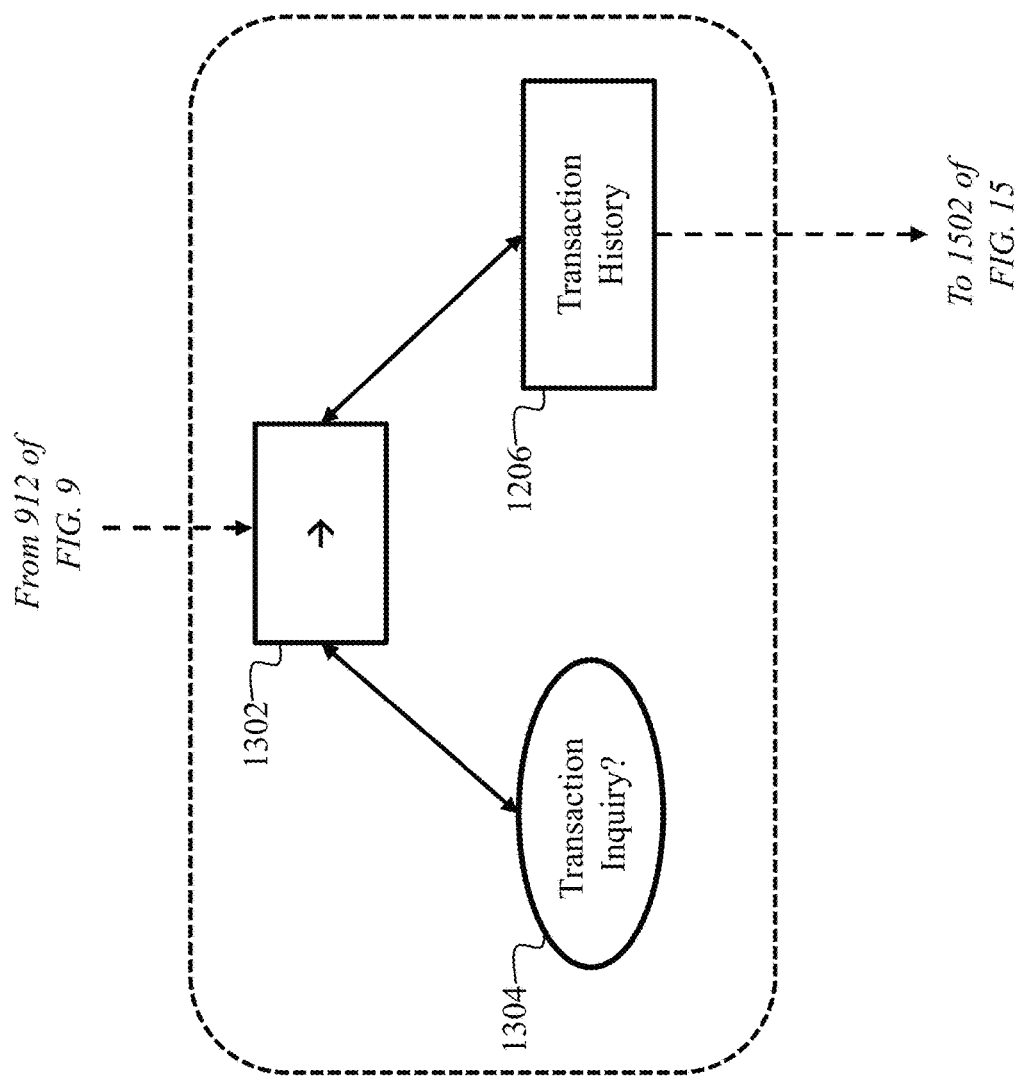
FIG. 13 is a diagram of an exemplary transaction inquiry sub-tree of a behavior tree.

FIG. 13 is a diagram of an exemplary transaction inquiry sub-tree 1300 of behavior tree 116. Sub-tree 1300 starts with sequence node 1302 which has two children: conditional node 1304 and task node 1306. Module 114 traverses to conditional node 1304 and evaluates the defined condition (i.e., determining whether the utterance/sub-utterance comprises a user request to view a transaction history for one or more accounts) in conditional node 1304. For example, module 114 can analyze the content of the sub-utterance and determine that the user has requested a list of historical transactions against one or more of their accounts. Therefore, the status of conditional node 1304 is set to 'success' and module 114 traverses to task node 1306. In this example, transaction history task node 1306 includes code that, when executed, sets a transaction history flag in dialogue memory 118. The account update flag denotes that the user has requested to view transaction history and conversation orchestration module 114 can reference the transaction history flag during traversal of subsequent node(s) in behavior tree to trigger other workflow agent(s) that carry out the transaction history retrieval request (as will be described below). Module 114 then traverses the behavior tree to node 1502 of FIG. 15.

Figure 14:
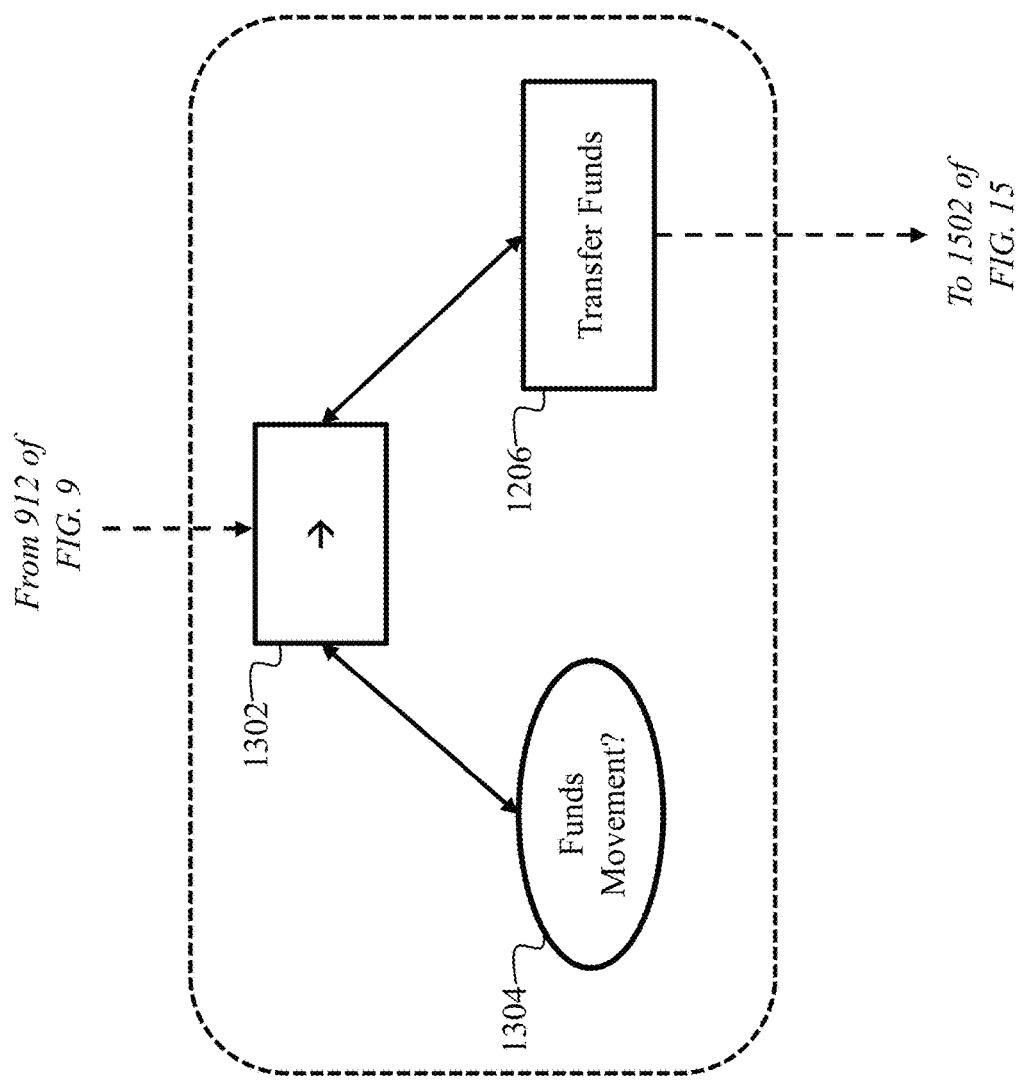
FIG. 14 is a diagram of an exemplary funds transfer sub-tree of a behavior tree.

FIG. 14 is a diagram of an exemplary funds transfer sub-tree 1400 of behavior tree 116. Sub-tree 1400 starts with sequence node 1402 which has two children: conditional node 1404 and task node 1406. Module 114 traverses to conditional node 1404 and evaluates the defined condition (i.e., determining whether the utterance/sub-utterance comprises a user request to move funds between one or more accounts) in conditional node 1404. For example, module 114 can analyze the content of the sub-utterance and determine that the user has requested to initiate a transfer of funds. Therefore, the status of conditional node 1404 is set to 'success' and module 114 traverses to task node 1406. In this example, transfer funds task node 1406 includes code that, when executed, sets a funds transfer flag in dialogue memory 118. The funds transfer flag denotes that the user has requested to initiate a transfer and conversation orchestration module 114 can reference the funds transfer flag during traversal of subsequent node(s) in behavior tree to trigger other workflow agent(s) that carry out the funds movement transaction (as will be described below). Module 114 then traverses the behavior tree to node 1502 of FIG. 15.

Figure 15:
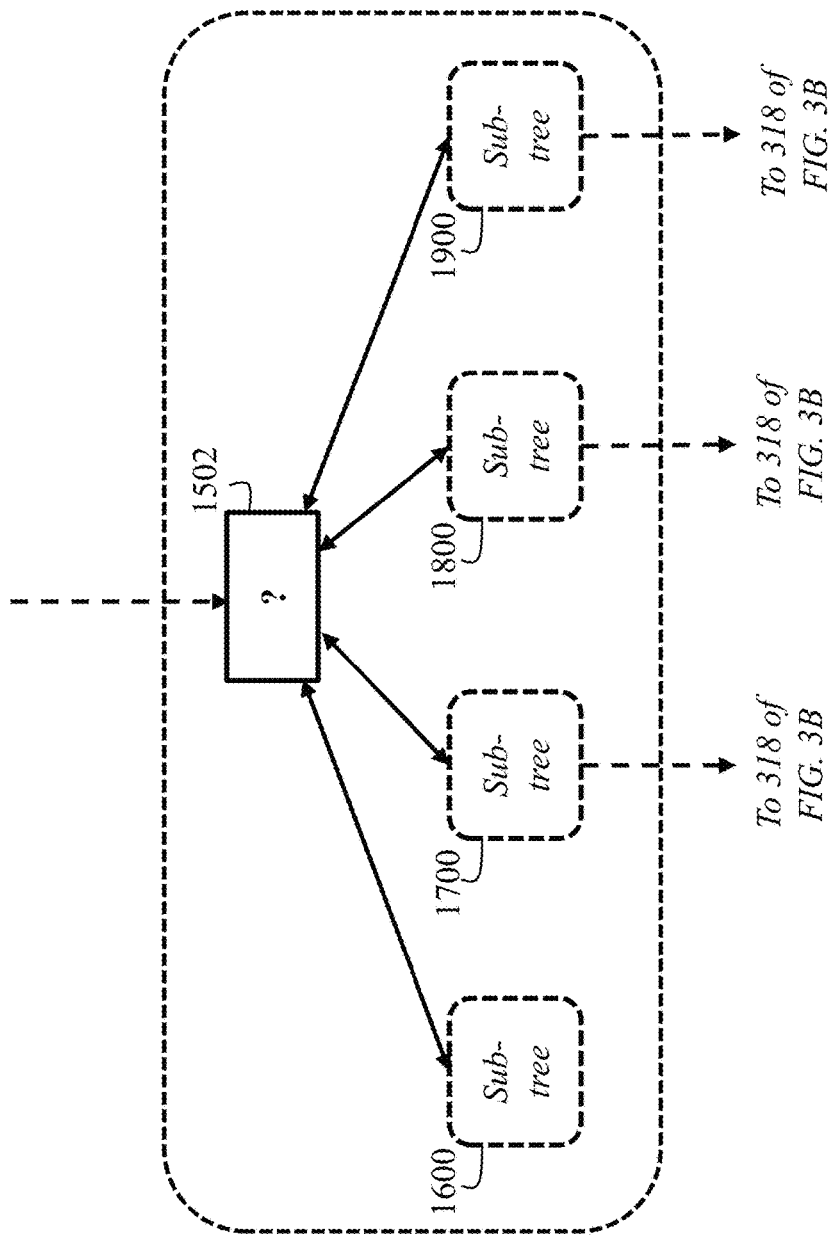
FIG. 15 is a diagram of a second portion of an exemplary multi-agent fulfillment sub-tree of a behavior tree.

FIG. 15 is a diagram of a second portion of an exemplary multi-agent fulfillment sub-tree 1500 of behavior tree 116. The tree depicted in FIG. 15 continues the workflow from FIG. 9. Sub-tree 1500 starts with a selector node 1502 with four children: sub-trees 1600, 1700, 1800, and 1900. Module 114 traverses to the sub-trees 1600, 1700, 1800, and 1900 in order from left to right as arranged in sub-tree 1500, and processes each sub-tree 1600, 1700, 1800, and 1900 to determine whether to carry out one or more workflow agent tasks.

Figure 16:
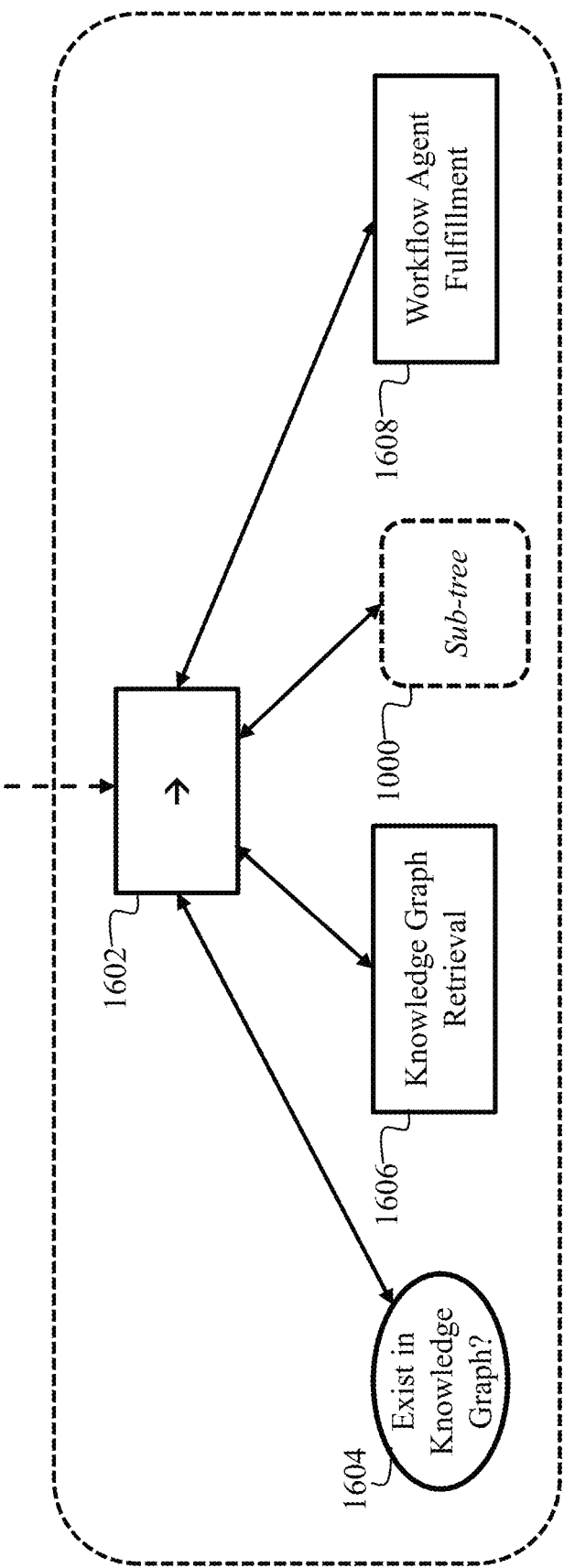
FIG. 16 is a diagram of an exemplary knowledge graph retrieval sub-tree of a behavior tree.

FIG. 16 is a diagram of an exemplary knowledge graph retrieval sub-tree 1600 of behavior tree 116. Sub-tree 1600 starts with sequence node 1602 and has four children: conditional node 1604, knowledge graph retrieval task node 1606, authentication sub-tree 1000 (described above), and workflow agent fulfillment task node 1608. Module 114 traverses to conditional node 1604 and evaluates the defined condition (i.e., determining whether a response to the utterance/sub-utterance can be found in a pre-configured knowledge graph) in conditional node 1604. In some embodiments, a knowledge graph can comprise one or more multidimensional data structures made up of entities and relationships that connect the entities. Generally, the entities in a knowledge graph comprise one or more characteristics and the relationships in the knowledge graph connect two entities based upon a semantic relationship between the two entities in text. In some embodiments, the knowledge graph comprises a domain-independent knowledge graph that is retrieved from an external data source and/or a domain-specific knowledge graph that is maintained in, e.g., database 120. In one example, the knowledge graph can comprise a publicly-available knowledge graph (such as Wikidata www.wikidata.org) that comprises structured data associated with a corpus of domain-independent documents (i.e., Wikipedia pages) that can be combined with a domain-specific knowledge graph curated by the organization which contains structured data associated with a corpus of domain-specific documents (e.g., organization manuals, FAQs, information pages, training documents, etc.). Module 114 can analyze the content of the sub-utterance and determine that the knowledge graph contains information that may be relevant to generating a response to the user utterance. Therefore, the status of conditional node 1604 is set to 'success' and module 114 traverses to task node 1606. In this example, knowledge graph retrieval task node 1606 includes code that, when executed, traverses the knowledge graph to identify and retrieve information and/or documents that are determined or predicted to be relevant to the user utterance. In some embodiments, module 114 stores the retrieved information (or pointers/links to the retrieved information) in dialogue memory 118. Next, module 114 transitions to executing one or more workflow agents as needed (via workflow agent fulfillment node 1608) in order to generate responses containing user-specific data and performing user-specific action items (e.g., account details, balances, transaction requests) relating to the utterance/sub-utterance. As a first step, module 114 traverses the behavior tree to authentication sub-tree 1000 (described above in FIG. 10) and performs the tasks for determining whether the user at client computing device 102 is authenticated. As can be appreciated in this case, authentication of the user prior to identifying and retrieving account-related information is essential to minimize the risk of data loss or unauthorized access to the information. Assuming the user is authenticated, module 114 traverses to workflow agent fulfillment task node 1608. Module 114 then executes code associated with task node 1608 to, e.g., evaluate the flags stored in dialogue memory 118 to determine which workflow agent(s) should be activated to prepare a response to the user utterance. As mentioned above, module 114 can store one or more flags in memory 118 that are used to trigger downstream workflow agent(s) to perform specific actions. Upon identifying which workflow agent(s) should be triggered, module 114 traverses the behavior tree back to node 1502 and proceeds to traverse to one or more of sub-trees 1700, 1800, and 1900 to carry out the requested action(s).

Figure 17:
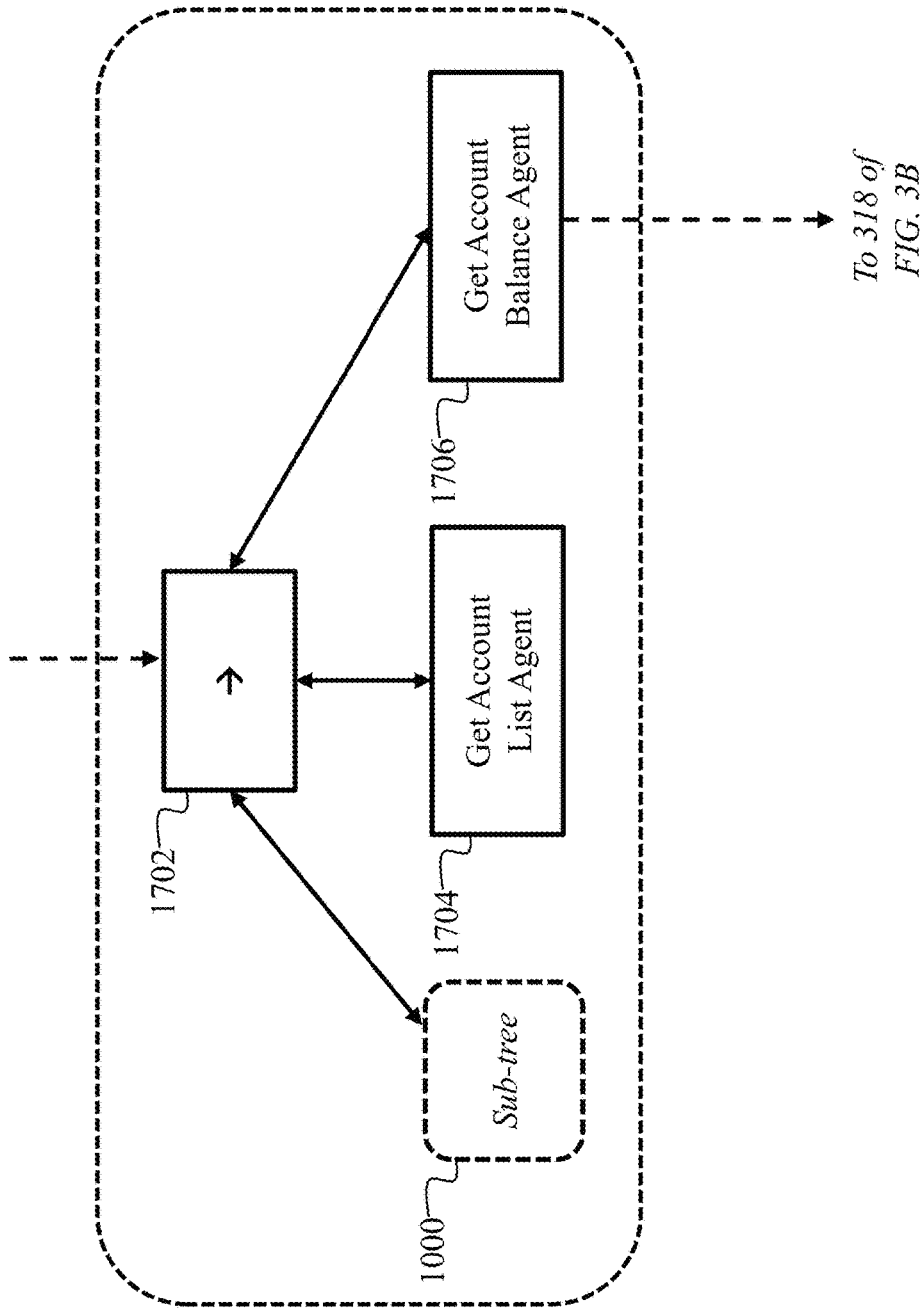
FIG. 17 is a diagram of an exemplary account balance agent fulfillment sub-tree of a behavior tree.

FIG. 17 is a diagram of an exemplary account balance agent fulfillment sub-tree 1700 of behavior tree 116. Sub-tree 1700 starts with sequence node 1702 with three children: authentication sub-tree 1000 (described above) and two task nodes 1704 and 1706. Module 114 traverses to authentication sub-tree 1000 and performs the tasks for determining whether the user at client computing device 102 is authenticated. Assuming the user is authenticated, module 114 traverses to get account list workflow agent task node 1704. Module 114 then executes code associated with task node 1704 to, e.g., retrieve a list of accounts associated with the end user. For example, module 114 can execute code that establishes a connection to database 120, generates a query for retrieval of user account information associated with one or more user indicia captured from client computing device 102 and/or stored in dialogue memory 118 during the chat session, and submits the query to database 120 for processing. Upon receiving the account list data from database 120, module 114 can store the account list data in dialogue memory 118 and then traverse to get account balance workflow agent task node 1706. Module 114 executes code associated with task node 1706 to, e.g., capture a current funds balance available in each of the accounts from the list data. For example, module 114 can execute code that uses the established connection to database 120 to retrieve balance information based upon the list of retrieved accounts stored in memory. Then, module 114 can store the balance information, mapped to the corresponding account(s), in dialogue memory 118 and generate a response (e.g., a table of the accounts and associated balances) for transmission to client computing device 102, which displays the response to the user during the chat session.

Figure 18:
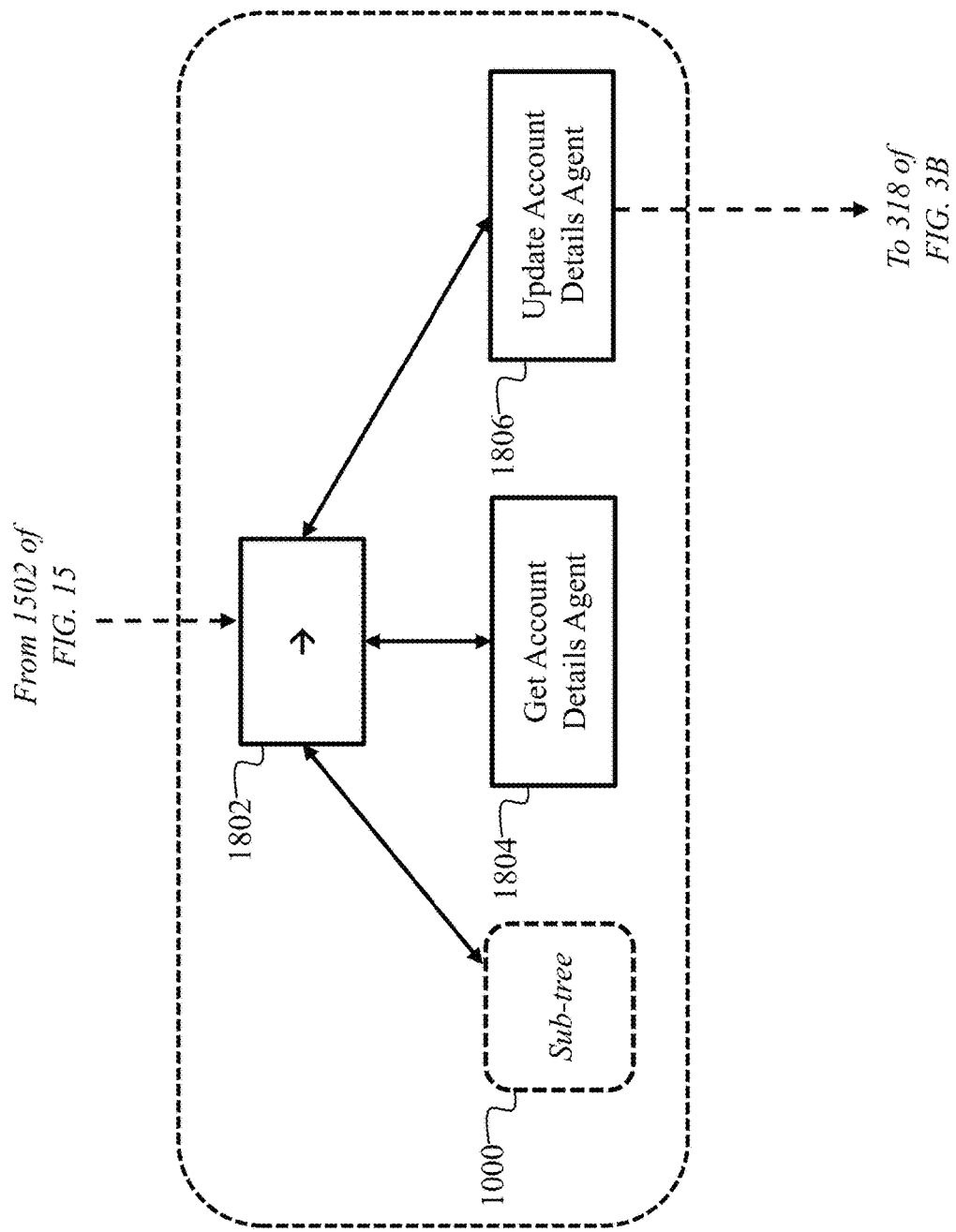
FIG. 18 is a diagram of an exemplary account details update agent fulfillment sub-tree of behavior tree.

FIG. 18 is a diagram of an exemplary account details update agent fulfillment sub-tree 1800 of behavior tree 116. Sub-tree 1800 starts with sequence node 1802 with three children: authentication sub-tree 1000 (described above) and two task nodes 1804 and 1806. Module 114 traverses to authentication sub-tree 1000 and performs the tasks for determining whether the user at client computing device 102 is authenticated. Assuming the user is authenticated, module 114 traverses to get account list workflow agent task node 1804. Module 114 then executes code associated with task node 1804 to, e.g., retrieve account details (e.g., mailing address, beneficiaries, direct deposit information, etc.) associated with one or more user accounts. For example, module 114 can execute code that establishes a connection to database 120, generates a query for retrieval of user account details associated with one or more of the user accounts stored in dialogue memory 118 during the chat session, and submits the query to database 120 for processing. Upon receiving the account details from database 120, module 114 can store the account details in dialogue memory 118 and then traverse to update account details workflow agent task node 1806. Module 114 executes code associated with task node 1806 to, e.g., perform a data update in database 120 for one or more account details as specified in the user utterance. For example, module 114 can execute code that uses the established connection to database 120 to perform an write/update operation on a data field in database 120 that stores the current account details being changed. Then, module 114 can generate a response (e.g., a confirmation message that the update was performed) for transmission to client computing device 102, which displays the response to the user during the chat session.

FIG. 19 is a diagram of an exemplary funds transfer workflow agent fulfillment sub-tree 1900 of behavior tree 116. Sub-tree 1900 starts with sequence node 1902 with four children: authentication sub-tree 1000 (described above) and three task nodes 1904, 1906, and 1908. Module 114 traverses to authentication sub-tree 1000 and performs the tasks for determining whether the user at client computing device 102 is authenticated. Assuming the user is authenticated, module 114 traverses to get eligible accounts workflow agent task node 1904. Module 114 then executes code associated with task node 1904 to, e.g., identify which user account(s) are eligible for withdrawal/deposit/transfer of funds. For example, module 114 can execute code that establishes a connection to database 120, analyzes account profile data for each user account using the list stored in memory 118, and identifies one or more accounts that are eligible (e.g., there are no transfer restrictions on the account). Upon receiving the eligible accounts from database 120, module 114 can store the eligible accounts in dialogue memory 118 (and/or update the list of accounts currently stored in dialogue memory 118 with indicia regarding eligibility) and then traverse to check balance workflow agent task node 1906. Module 114 executes code associated with task node 1906 to, e.g., check a current funds balance available in each of the accounts from the list data stored in dialogue memory 118. For example, module 114 can execute code that uses the established connection to database 120 to retrieve balance information based upon the list of retrieved accounts stored in memory 118. In another example, module 114 can execute code that retrieves stored account balance data from dialogue memory 118 and determines, e.g., whether there are sufficient funds to perform a transfer. Module 114 can then traverse to transfer funds workflow agent task node 1908. Module 114 executes code associated with task node 1908 to, e.g., execute the requested funds transfer transaction. For example, module 114 can execute code that issues an API call to a transaction and/or trading platform hosted by a separate computing device to perform the transfer of money from a source account to a destination account. Then, module 114 can store the transaction details (e.g., account numbers, transfer amount, transfer timestamp, transfer confirmation number, etc.) in dialogue memory 118 and generate a response (e.g., a confirmation message with transaction details) and transmits the response to client computing device 102 for display to the user.

It should be appreciated that conversation orchestration module 114 can generate any number of sub-responses associated with each of the workflow agents and other behavior tree processing steps described above. In some embodiments, module 114 stores each of the generated sub-responses in dialogue memory 118 and/or database 120 as traversal of the behavior tree 116 is being performed-instead of sending each sub-response to client computing device 102 separately at the time the sub-response is generated. Then, when module 114 determines that the current traversal of the instance of behavior tree 116 is complete (e.g., module 114 has reached generate response task node 318 of FIG. 3B), module 114 can execute code associated with generate response task node 318 to coalesce a plurality of the sub-responses stored in dialogue memory 118 and/or database 120 into a final response to the user utterance. For example, module 114 can combine one or more of the sub-responses into a single message that is transmitted to client computing device 102 for display.

In some embodiments, module 114 can then traverse behavior tree 116 to follow up task node 320 and executes code associated with task node 320 to determine whether to continue the chat session with the end user. For example, conversation orchestration module 114 can generate a message asking the user whether there is anything else that the user needs during the session. If the user answers in the affirmative or provides another utterance, module 114 can instantiate a new instance of behavior tree 116, receive the next utterance from the user, and process the utterance using the new instance of behavior tree as described herein.

An important aspect of system 100 is the use of dialogue memory 118 to store not only responses/sub-response(s) generated from traversal of the behavior tree, but also to store a bit vector that contains values corresponding to the traversal of nodes in the behavior tree for a given chat session. Generally, each value in the bit vector corresponds to a task node in the behavior tree—although in some embodiments, values in the bit vector can also correspond to other types of nodes in the tree. In some embodiments, the bit vector includes binary values representing the determination made by behavior tree 116 of whether to execute the code in the traversed workflow agent(s)—i.e., when the condition(s) associated with execution of the workflow agent are met, the bit vector includes a value of '1' for the workflow agent node and/or sub-tree, when the condition(s) associated with execution of the workflow agent are not met, the bit vector includes a value of '0.' In some embodiments, the bit vector can include binary values representing whether a given task node was successfully executed. In still other embodiments, the bit vector can include binary values representing whether a given task node was traversed or not.

Storage of the traversal and/or execution decisions conducted during traversal of the behavior tree as a bit vector in dialogue memory 118 has several technical advantages. As described above, dialogue memory 118 can be implemented as an in-memory cache which enables fast storage and retrieval of data. Therefore, VA application 108 can retrieve bit vector data for one or more chat sessions as sessions are taking place and aggregate the bit vector data to have a real-time view of which portion(s) or node(s) in the behavior tree are being traversed and/or interacted with. System administrators can leverage this data to determine how best to scale and allocate computing resources to VA application 108 and/or other computing devices called during execution of workflow agents to meet demand. For example, if a majority of chat sessions in a given timeframe include traversal of an authentication workflow agent hosted on an authentication server cluster, administrators may decide to increase the computing resources available to the authentication server cluster so that authentication can be completed without slowdown or interruption to the user experience. Another advantage is that by storing traversal data as a bit vector, instead of a larger or more complex data structure, processing time and requirements for analysis of the bit vector are reduced. For example, the binary values in a bit vector can be processed quickly to get a real-time snapshot of traversal and execution decisions made by VA application 108 during a particular chat session. The vector also normalizes the decisions made by VA application 108 to a standardized format across chat sessions, making data analysis more adaptable and efficient.

Also, as described previously, VA application 108 can store session-related data and metadata in one or more session slots in memory 118 and/or database 120. VA application 108 can be configured to store one or more objects (e.g., Javascript™ objects) or data structures in session slots that contain specific chat session context data, including but not limited to prior utterances and/or responses in the chat session, user profile data elements, chat session state, or timestamps. In some embodiments, each session slot is configured with an identifier (e.g. key, name, or other type of identifier) that uniquely identifies the slot and the particular chat session to which the slot is assigned or otherwise associated. This avoids the creation of slots with the same identifier, which could cause data access and data integrity errors. In some embodiments, each session slot is also configured with a slot value. The slot value can be a static value (such as a number, a text string, etc.) that is stored in the slot, or the slot value can be a dynamic expression that is evaluated to determine a data value that corresponds to the slot.

In view of the above description, it can be appreciated that by using behavior tree structures in combination with a low-latency, high-availability in-memory data cache, the systems and methods described herein provide several technical advantages over existing conversation service applications. The behavior tree-based design enables improved orchestration of VA application software responses but, unlike traditional VA software, the behavior tree beneficially does not follow a linear script and traditional intent-based routing paradigm. Instead, use of a behavior tree enables the system and methods to dynamically adapt responses and workflow actions, which allows for advanced decision-making and adaptability to diverse customer interactions, bringing the VA application a step closer to human-like problem handling.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

The computer program can be deployed in a cloud computing environment (e.g., Amazon® AWS, Microsoft® Azure, IBM@Cloud™). A cloud computing environment includes a collection of computing resources provided as a service to one or more remote computing devices that connect to the cloud computing environment via a service account which allows access to the aforementioned computing resources. Cloud applications use various resources that are distributed within the cloud computing environment, across availability zones, and/or across multiple computing environments or data centers. Cloud applications are hosted as a service and use transitory, temporary, and/or persistent storage to store their data. These applications leverage cloud infrastructure that eliminates the need for continuous monitoring of computing infrastructure by the application developers, such as provisioning servers, clusters, virtual machines, storage devices, and/or network resources. Instead, developers use resources in the cloud computing environment to build and run the application and store relevant data.

Method steps can be performed by one or more processors executing a computer program to perform functions of the invention by operating on input data and/or generating output data. Subroutines can refer to portions of the stored computer program and/or the processor, and/or the special circuitry that implement one or more functions. Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random-access memory or both. The essential elements of a computer are a processor for executing instructions and one or more memory devices for storing instructions and/or data. Exemplary processors can include, but are not limited to, integrated circuit (IC) microprocessors (including single-core and multi-core processors). Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), an ASIC (application-specific integrated circuit), Graphics Processing Unit (GPU) hardware (integrated and/or discrete), another type of specialized processor or processors configured to carry out the method steps, or the like.

Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices (e.g., NAND flash memory, solid state drives (SSD)); magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above-described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). The systems and methods described herein can be configured to interact with a user via wearable computing devices, such as an augmented reality (AR) appliance, a virtual reality (VR) appliance, a mixed reality (MR) appliance, or another type of device. Exemplary wearable computing devices can include, but are not limited to, headsets such as Meta™ Quest 3™ and Apple® Vision Pro™. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above-described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above-described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN),), a private IP network, an IP private branch exchange (IPBX), a wireless network (e.g., radio access network (RAN), Bluetooth™ near field communications (NFC) network, Wi-Fi™, WiMAX™, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), cellular networks, and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE), cellular (e.g., 4G, 5G), and/or other communication protocols.

Devices of the computing system can include, for example, a computer, a computer with a browser device, a telephone, an IP phone, a mobile device (e.g., cellular phone, personal digital assistant (PDA) device, smartphone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Safari™ from Apple, Inc., Microsoft® Edge® from Microsoft Corporation, and/or Mozilla® Firefox from Mozilla Corporation). Mobile computing devices include, for example, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

The methods and systems described herein can utilize artificial intelligence (AI) and/or machine learning (ML) algorithms to process data and/or control computing devices. In one example, a classification model, is a trained ML algorithm that receives and analyzes input to generate corresponding output, most often a classification and/or label of the input according to a particular framework.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computer system for conversation dialogue orchestration in virtual assistant communication sessions, the system comprising a server computing device having a memory that stores computer-executable instructions and a processor that executes the computer-executable instructions to:

establish chat-based communication sessions between a virtual assistant application of the server computing device and each of a plurality of client computing devices;

for each of the chat-based communication sessions:
  capture, by the virtual assistant application, an utterance generated by a user of the client computing device during the chat-based communication session;
  process, by the virtual assistant application, the utterance to instantiate a dialogue behavior tree comprising a plurality of workflow agents each associated with executable code for completing a corresponding workflow action, the plurality of workflow agents including an authentication agent for verifying an identify of a user at the client computing device;
  traverse, by the virtual assistant application, the dialogue behavior tree to generate a response to the utterance, including for each workflow agent:
    evaluating one or more conditions associated with the workflow agent to determine whether to execute the code in the workflow agent,
    when the conditions associated with the workflow agent are met, executing the code in the workflow agent to complete the workflow action and storing a sub-response associated with the completed workflow action in a dialogue memory comprising an in-memory data store, and
    storing a bit vector in the dialogue memory, the bit vector comprising a plurality of binary values representing the determination of whether to execute the code in each workflow agent made by the virtual assistant application during traversal of the dialogue behavior tree,
  coalesce, by the virtual assistant application, the sub-responses stored in the dialogue memory to generate a final response to the utterance; and
  transmit, by the virtual assistant application, the final response to the client computing device for display during the chat-based communication session;
aggregate the bit vectors generated during each of the chat-based communication sessions to generate a real-time view of user interactions with the dialogue behavior tree; and
scale one or more computing resources of an authentication server cluster that hosts the authentication agent when the aggregated bit vectors indicate that a minimum number of chat-based communication sessions invoke the authentication agent.

2. The system of claim 1, wherein processing the utterance to instantiate a dialogue behavior tree comprises rewriting the utterance using a first natural language understanding (NLU) algorithm.

3. The system of claim 2, wherein the virtual assistant application:
  creates one or more sub-utterances using the rewritten utterance; and
  extracts an objective comprising one or more of: a topic, a subtopic, a local objective, a dialog act, and an entity from each of the sub-utterances using a second NLU algorithm.

4. The system of claim 3, wherein the virtual assistant application analyzes the extracted objectives to determine a context used to instantiate the dialogue behavior tree.

5. The system of claim 1, wherein the virtual assistant application evaluates the one or more conditions associated with a plurality of different workflow agents in parallel during traversal of the dialogue behavior tree.

6. The system of claim 5, wherein the virtual assistant application executes the code in a plurality of different workflow agents in parallel during traversal of the dialogue behavior tree.

7. The system of claim 1, wherein one or more of the plurality of workflow agents in the dialogue behavior tree comprises a behavior sub-tree including a plurality of workflow sub-agents each associated with executable code for completing a corresponding workflow action.

8. The system of claim 1, wherein evaluating one or more conditions associated with the workflow agent to determine whether to execute the code in the workflow agent comprises comparing one or more session values for the chat-based communication session against the one or more conditions associated with the workflow agent to determine whether the conditions are met.

9. The system of claim 8, wherein the executable code for completing a corresponding workflow action comprises a function call that invokes one or more application resources coupled to the server computing device.

10. A computerized method of conversation dialogue orchestration in virtual assistant communication sessions, the method comprising:
  establishing, by a server computing device, chat-based communication sessions between a virtual assistant application of the server computing device and each of a plurality of client computing devices;
  for each of the plurality of chat-based communication sessions:
    capturing, by the virtual assistant application, an utterance generated by a user of the client computing device during the chat-based communication session;
    processing, by the virtual assistant application, the utterance to instantiate a dialogue behavior tree comprising a plurality of workflow agents each associated with executable code for completing a corresponding workflow action, the plurality of workflow agents including an authentication agent for verifying an identify of a user at the client computing device;
    traversing, by the virtual assistant application, the dialogue behavior tree to generate a response to the utterance, including for each workflow agent:
      evaluating one or more conditions associated with the workflow agent to determine whether to execute the code in the workflow agent, and
      when the conditions associated with the workflow agent are met, executing the code in the workflow agent to complete the workflow action and storing a sub-response associated with the completed workflow action in a dialogue memory comprising an in-memory data store, and
      storing a bit vector in the dialogue memory, the bit vector comprising a plurality of binary values representing the determination of whether to execute the code in each workflow agent made by the virtual assistant application during traversal of the dialogue behavior tree,
    coalescing, by the virtual assistant application, the sub-responses stored in the dialogue memory to generate a final response to the utterance; and transmitting, by the virtual assistant application, the final response to the client computing device for display during the chat-based communication session;

aggregating, by the server computing device, the bit vectors generated during each of the chat-based communication sessions to generate a real-time view of user interactions with the dialogue behavior tree; and scaling, by the server computing device, one or more computing resources of an authentication server cluster that hosts the authentication agent when the aggregated bit vectors indicate that a minimum number of chat-based communication sessions invoke the authentication agent.

11. The method of claim 10, wherein processing the utterance to instantiate a dialogue behavior tree comprises rewriting the utterance using a first natural language understanding (NLU) algorithm.

12. The method of claim 11, further comprising:
creating, by the virtual assistant application, one or more sub-utterances using the rewritten utterance; and
extracting, by the virtual assistant application, an objective comprising one or more of: a topic, a subtopic, a local objective, a dialog act, and an entity from each of the sub-utterances using a second NLU algorithm.

13. The method of claim 12, further comprising analyzing, by the virtual assistant application, the extracted objectives to determine a context used to instantiate the dialogue behavior tree.

14. The method of claim 10, further comprising evaluating, by the virtual assistant application, the one or more conditions associated with a plurality of different workflow agents in parallel during traversal of the dialogue behavior tree.

15. The system of claim 14, further comprising executing, by the virtual assistant application, the code in a plurality of different workflow agents in parallel during traversal of the dialogue behavior tree.

16. The method of claim 10, wherein one or more of the plurality of workflow agents in the dialogue behavior tree comprises a behavior sub-tree including a plurality of workflow sub-agents each associated with executable code for completing a corresponding workflow action.

17. The method of claim 10, wherein evaluating one or more conditions associated with the workflow agent to determine whether to execute the code in the workflow agent comprises comparing one or more session values for the chat-based communication session against the one or more conditions associated with the workflow agent to determine whether the conditions are met.

18. The method of claim 17, wherein the executable code for completing a corresponding workflow action comprises a function call that invokes one or more application resources coupled to the server computing device.

\* \* \* \* \*